United States Patent

Inoue et al.

[11] Patent Number: 5,913,182
[45] Date of Patent: Jun. 15, 1999

[54] TAKE-UP DEVICE

[75] Inventors: Yuji Inoue; Yasuhiko Kachi; Toshiya Kojima; Yasuyuki Mochizuki, all of Kanagawa, Japan

[73] Assignee: Fuji Photo Film Co., Ltd., Kanagawa, Japan

[21] Appl. No.: 08/864,723

[22] Filed: May 28, 1997

[30] Foreign Application Priority Data

May 28, 1996 [JP] Japan .................................. 8-133281
Jun. 5, 1996 [JP] Japan .................................. 8-143240

[51] Int. Cl.$^6$ .................................................... B41L 13/08
[52] U.S. Cl. ............................ 702/97; 702/158; 242/534
[58] Field of Search ................................ 242/534, 534.2, 242/541.3, 541.4; 702/97, 158

[56] References Cited

U.S. PATENT DOCUMENTS

| | | | |
|---|---|---|---|
| 3,871,598 | 3/1975 | Kataoka | 242/414.1 |
| 3,957,220 | 5/1976 | Beck et al. | 242/541.3 |
| 4,150,797 | 4/1979 | Kataoka | 242/542.3 |
| 4,508,284 | 4/1985 | Kataoka | 242/413.2 |
| 4,566,383 | 1/1986 | Matsushita et al. | 101/121 |
| 4,722,490 | 2/1988 | Doerfel | 242/413.9 |
| 4,842,208 | 6/1989 | Kitamura | 29/564.7 |
| 5,116,043 | 5/1992 | Jermann et al. | 242/528 |
| 5,433,122 | 7/1995 | Zeller et al. | 702/164 |
| 5,437,417 | 8/1995 | Kammann | 242/412.1 |

*Primary Examiner*—John Barlow
*Assistant Examiner*—Craig Steven Miller
*Attorney, Agent, or Firm*—Sughrue, Mion, Zinn, Macpeak & Seas, PLLC

[57] ABSTRACT

A take-up device of an image forming sheet material, in which a plurality of sheet materials used for formation of images is sequentially wound, comprises: a core member formed in the shape of a cylinder and supported rotatably, the core member being provided such that the plurality of sheet materials can be wound around an outer periphery of the core member; an endless belt entrained across a plurality of rollers and moved in a circulating manner in a predetermined direction with an outer periphery of the endless belt contacting by pressure an outer periphery of the core member so as to rotate the core member and the endless belt nipping the sheet material together with the core member to sequentially wind the plurality of sheet materials around the core member; and tension maintaining means for maintaining tension of the endless belt substantially fixedly irrespective of a change of a winding diameter of the sheet material wound around the core member. Since the plurality of sheet materials are accumulated in such a manner as to be wound around the core member, even if the sheet materials having different sizes are included mixedly, these material be effectively accumulated.

20 Claims, 14 Drawing Sheets

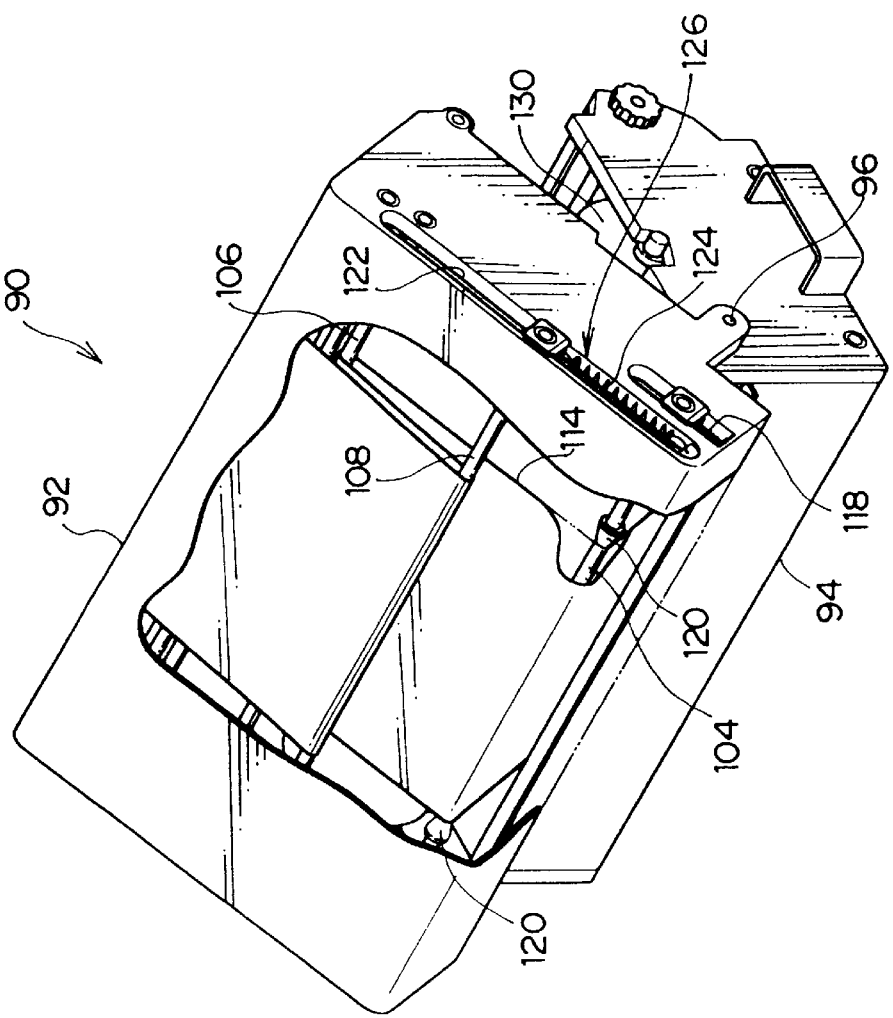

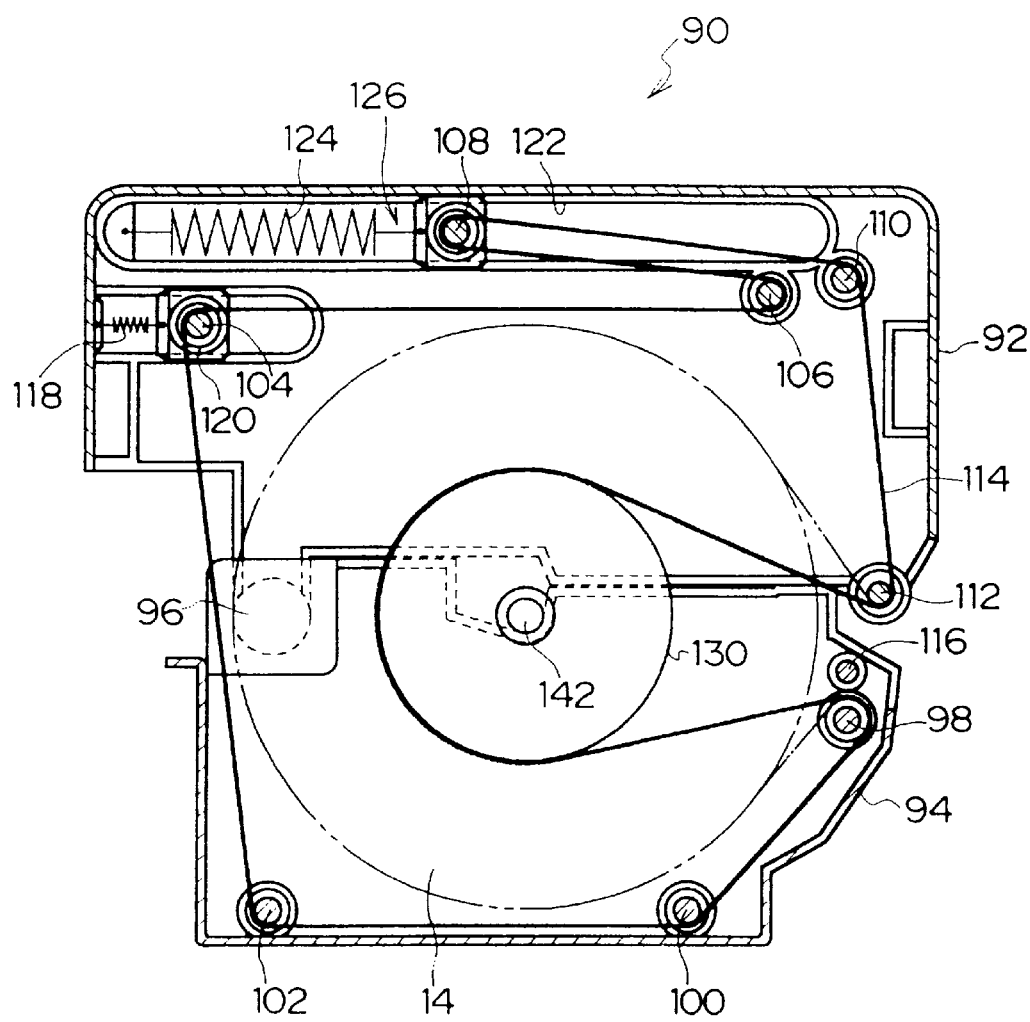
F I G. 2

F I G. 1 3
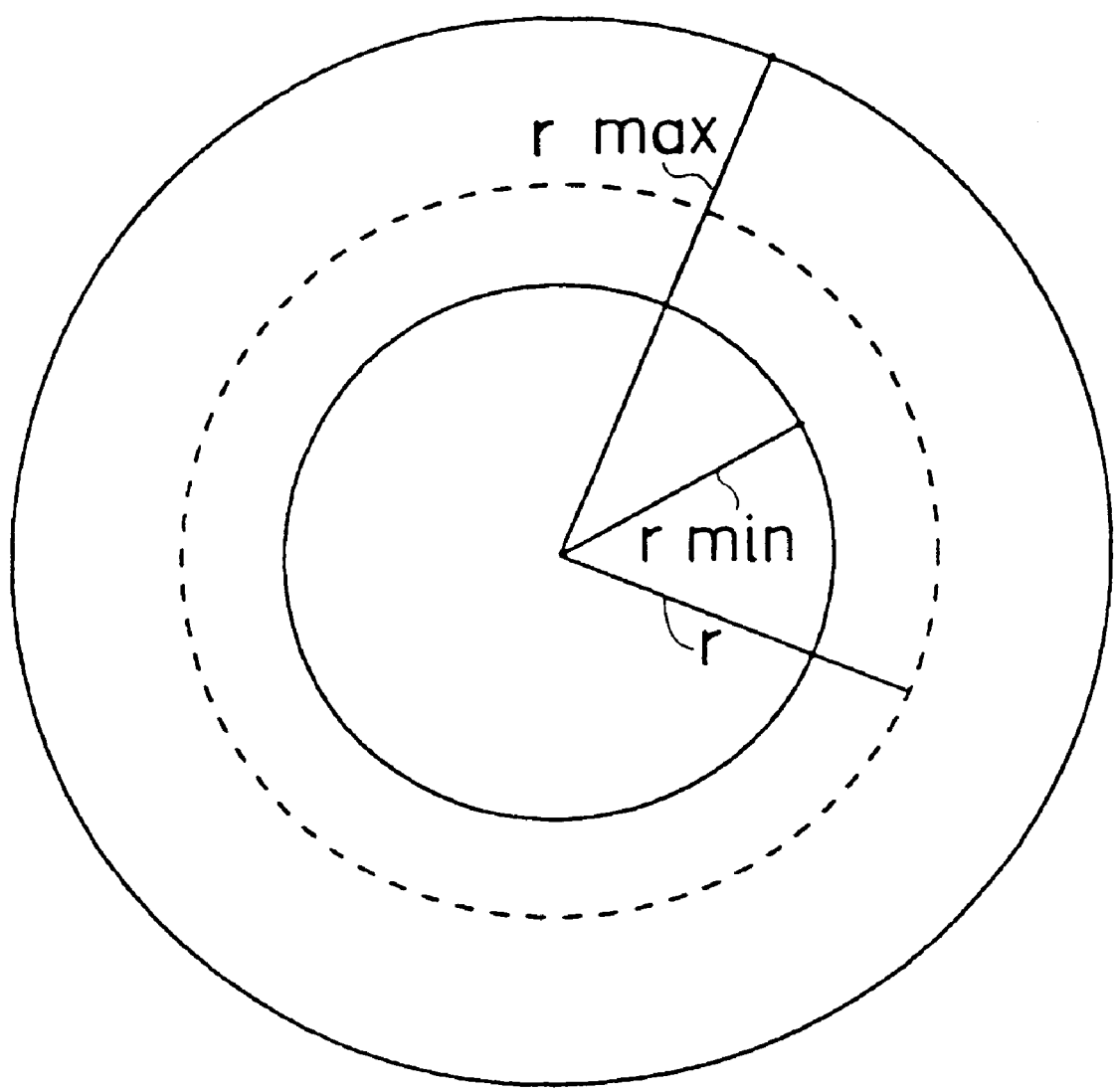

TAKE-UP DEVICE

BACKGROUND OF THE INVENTION

1. Field of the Invention

The present invention relates to a take-up device, and particularly to a take-up device for winding a sheet-shaped material such as sheet-shaped photosensitive material or image receiving material in the form of a roll.

2. Description of the Related Art

There has conventionally been known an image recording apparatus in which image recording processing is effected by using, as an image recording material, two kinds of sheet-shaped materials, i.e., a photosensitive material and an image receiving material.

In the image recording apparatus of this type, the photosensitive material and the image receiving material are accommodated in respective magazines, whose interiors are each set in a light-shielding state, in such a manner as to be wound in the form of a roll. Each time the image recording processing is effected, the photosensitive material and the image receiving material are each used in a state of being sequentially nipped and pulled out by pull-out rollers. Further, the image recording apparatus is provided with an exposure section in which an image is exposed onto a photosensitive material and a water applying section in which an image forming solvent is applied to the exposed photosensitive material. Moreover, a heat-development transfer section is disposed by the side of the water applying section. A plurality of guide plates and a plurality of conveying rollers are disposed each between the exposure section and the water applying section and between the water applying section and the heat-development transfer section so as to allow connection between the exposure section, the water applying section, and the heat-development transfer section.

The photosensitive material pulled out from the magazine and cut down to a predetermined length is processed in such a manner that an image is exposed onto the photosensitive material while the photosensitive material is nipped and conveyed by conveying rollers, and in the water applying section, water used as an image forming solvent is applied to the photosensitive material, and thereafter, the photosensitive material is fed into the heat-development transfer section. The image receiving material is pulled out from the magazine and cut down to a predetermined length in the same manner as in the photosensitive material, and is then fed into the heat-development transfer section by conveying rollers synchronously with the conveying of the photosensitive material. In the heat-development transfer section, the photosensitive material to which water is applied and the image receiving material are made overlapping each other. While both of the materials are conveyed in the overlapping state, the photosensitive material is subjected to heat-development processing and an image is transferred to the image receiving material, and therefore, a predetermined image is formed (recorded) on the image receiving material. Subsequently, the photosensitive material and the image receiving material are separated from each other and the image receiving material on which the image is recorded is pulled out from the apparatus.

On the other hand, in the conventional image recording apparatus such as the above, a used photosensitive material after having been separated from the image receiving material as described above is conveyed to a waste photosensitive material accumulating box provided within the apparatus, and the used materials are sequentially accumulated to be overlapping one another in the waste photosensitive material accumulating box in the direction in thickness thereof irrespective of respective sizes of used photosensitive materials.

For this reason, for example, when used photosensitive materials having different sizes are accumulated mixedly, a useless (unusable) space is formed within the waste photosensitive material accumulating box so that the capacity of the waste photosensitive material accumulating box, in which used materials can be accumulated, necessarily lessens. In other words, it is necessary to set the size of the conventional waste photosensitive material accumulating box like this correspondingly to a photosensitive material having the maximum size and the internal capacity of the waste photosensitive material accumulating box cannot be effectively utilized.

Further, there may be cases in which a curling is generated in the photosensitive material with water being applied thereto after the photosensitive material is heated and separated from the image receiving material. When the curling is generated in the photosensitive material, the photosensitive materials cannot be accumulated in the waste photosensitive material accumulating box in such a manner as to be sequentially and uniformly laid overlapping one another. Accordingly, in this case, it is necessary to take measures to provide a presser plate for preventing occurrence of the curling, increase rigidity of the photosensitive material by providing folds (corrugation) in the photosensitive material itself, or the like. For this reason, the structure of the apparatus becomes complicated and the cost thereof increases.

In addition, in the above-described conventional image recording apparatus, the used photosensitive materials are sequentially accumulated overlapping one another in the direction in thickness thereof. Accordingly, in order to detect the limit of accumulation and calculate the ratio of an existing accumulation amount with respect to the maximum allowable accumulation amount (i.e., an accumulation ratio), for example, by detecting an angle θ formed by a pressing member 334 for pressing down used photosensitive materials 332 accumulated as shown in FIG. 14 and the side surface of an image recording apparatus 330 and on the basis of the angle θ, the thickness of the used photosensitive materials 332, i.e., the existing accumulation amount is detected.

However, the above-described accumulation-amount detecting method cannot be applied to a case in which a sheet-shaped material is wound around an outer periphery of a predetermined core member.

In view of the above-described circumstances, it is an object of the present invention to provide a take-up device of image-forming sheet-shaped materials such as a photosensitive material and an image receiving material, in which the image-forming sheet-shaped materials can be effectively accumulated in a small space.

Another object of the present invention is to provide a take-up device which allows calculation of a winding ratio of an existing winding amount with respect to the maximum winding amount of a sheet-shaped material in the structure in which the sheet-shaped material is wound around an outer periphery of a predetermined take-up core member.

SUMMARY OF THE INVENTION

In order to achieve the above-described objects, in accordance with a first aspect of the present invention, there is provided a take-up device of an image forming sheet material, in which a plurality of sheet materials used for formation of images are sequentially wound, comprising: a core member formed in the shape of a cylinder and supported rotatably, said core member being provided such that the plurality of sheet materials can be wound around an outer periphery of the core member; an endless belt entrained across a plurality of rollers and moved in a circulating manner in a predetermined direction with an outer periphery of the endless belt contacting by pressure an outer periphery of the core member so as to rotate the core member and the endless belt nipping the sheet material together with the core member to sequentially wind the plurality of sheet materials around the core member; and tension maintaining means for maintaining tension of the endless belt substantially fixedly irrespective of a change of a winding diameter of the sheet material wound around the core member.

In accordance with the first aspect of the present invention, the plurality of sheet materials is nipped by the core member and the endless belt and is further sequentially wound around the core member so as to be accumulated. Further, the winding diameter of the core member gradually increases as the plurality of sheet materials is sequentially wound around the core member. However, tension of the endless belt is constantly maintained by the tension maintaining means substantially at a fixed value, and therefore, nipping force of the endless belt and the core member is constantly maintained substantially at a fixed value.

As described above, since the plurality of sheet materials is accommodated in such a manner as to be wound around the core member, even if the sheet materials having different sizes are included mixedly, the sheet materials can be effectively accumulated. Further, since the sheet materials are each accumulated in such a manner as to be nipped by the core member and the endless belt, it is possible to prevent occurrence of curling of each sheet material in a direction in which the sheet material is separated from the core member. Accordingly, it is not necessary to provide, in the take-up device, a curling preventing member such as a presser plate for preventing occurrence of curling. Further, it is also not necessary to provide corrugation which increases the rigidity of each of the sheet materials by forming corrugation in the sheet material, so as to prevent occurrence of curling in the sheet material. As a result, the structure of the take-up device becomes simple and reduction in the manufacturing cost can be achieved.

A second aspect of the present invention is a take-up device of an image forming sheet material in the first aspect, which further comprises: a container which includes a first box-shaped member and a second box-shaped member and which is brought into an open state and a closed state with the first box-shaped member and the second box-shaped member being connected to each other in a relatively swingable manner, wherein the container allows accommodation of the core member, the plurality of rollers, the tension maintaining means, and the endless belt, and when the container is brought into an open state, the container is provided such that the core member can be removed from the container, and the core member, the plurality of rollers, the endless belt, the tension maintaining means, and the container are formed integrally as a unit structure.

In accordance with the second aspect of the present invention, the take-up device is constructed in that the core member, the plurality of rollers, the endless belt, the tension maintaining means, and the container are integrally formed as a unit structure, and therefore, the adaptability of the take-up device is improved. Further, when the container is brought into an open state, the core member can be removed from the container. For this reason, the plurality of sheet materials wound around the core member can easily be removed, and further, maintenance of the take-up device can simply be performed.

A third aspect of the present invention is a take-up device of an image forming sheet material in the first aspect, in which the endless belt is moved in a circulating manner substantially at a constant speed, the take-up device further comprising: winding ratio calculating means which utilizes that a time that the sheet material is wound around the core member during rotation of the core member at a predetermined rotational angle is proportional to a winding diameter which varies as the sheet material is wound around the core member, and on the basis of a time that the sheet material is wound around the core member during rotation of the core member at a predetermined rotational angle in the winding diameter at a certain point in time, a time that the sheet material is wound around the core member during rotation of the core member at a predetermined rotational angle in the winding diameter in the winding diameter of a previously obtained winding initial state, and a time that the sheet material is wound around the core member during rotation of the core member at a predetermined rotational angle in the winding diameter a little before a previously obtained maximum allowable winding state, the winding ratio calculating means calculating a winding ratio of an amount by which the sheet material is wound around the core member at the certain point in time with respect to the previously obtained maximum allowable winding amount of the sheet material onto the core member.

A fourth aspect of the present invention is a take-up device of an image forming sheet material in the first aspect, in which the endless belt is moved in a circulating manner substantially at a constant speed, the take-up device further comprising: rotational angle detecting means which generates a signal every time the core member rotates at a predetermined angle; time interval measuring means for measuring, based on the signal, a time interval required for rotation of the core member at the predetermined angle; and winding ratio calculating means which calculates, on the basis of time interval t measured by the time interval measuring means, time interval $T_0$ required for rotation of the core member at the predetermined angle in a previously obtained winding initial state of the sheet material onto the core member, and time interval $T_1$ required for rotation of the core member at the predetermined angle in a state a little before the previously obtained maximum allowable winding state of the sheet material onto the core member, winding ratio R of an amount by which the sheet material is wound around the core member at the point in time measured by the time interval measuring means with respect to the previously obtained maximum allowable winding amount $L_1$ of the sheet material onto the core member by using the following expression (1):

$$R = \frac{(t - T_0) \cdot (t + T_0)}{(T_1 - T_0) \cdot (T_1 - T_0)} \tag{1}$$

A fifth aspect of the present invention is a take-up device of an image forming sheet material in the fourth aspect, which further comprises: winding allowable amount calculating means which calculates, on the basis of the winding ratio R calculated by the winding ratio calculating means and the maximum allowable winding amount $L_1$, the winding allowable amount Lb of the sheet material onto the core member after the certain point in time by using the following expression (2); and reporting means for reporting the winding allowable amount Lb calculated by the winding allowable amount calculating means:

$$Lb = L_1 \cdot (1-R) \quad (2)$$

Here, a description will be given of the grounds of the above-described expression (1). First, in order to simplify illustration thereof, there is supposed a case in which an elongated sheet to be wound is wound around a predetermined core member. In FIG. 13, assuming that thickness, $\Delta T$, of one sheet is set at a fixed value due to radius $r_{min}$ (the radius of the core member) in a winding initial state in which no material is wound around the core member, radius $r_{max}$ in the maximum allowable winding state, and winding thickness being all fixed, radius $r_n$ and length $LG_n$ of an outer periphery of the core member when the winding number of rounds is set at a value "n" are respectively given by the following expressions (3) and (4).

$$r_n = r_{min} + \Delta T \cdot n \quad (3)$$

$$LG_n = 2\pi r_n = 2\pi(r_{min} + \Delta T \cdot n) \quad (4)$$

Length $L_m$ of the sheet material wound onto the core member "m" rounds is given by the following expression (5).

$$Lm = \sum_{n=1}^{n=m} LGn = \sum_{n=1}^{n=m} (2\pi(r_{min} + \Delta T \cdot n)) \quad (5)$$
$$= 2\pi(r_{min} \cdot m + \Delta T \cdot m(m+1)/2)$$
$$= \pi m(2r_{min} + \Delta T(m+1))$$

The winding number of rounds, n, in the case of the radius $r_n$, is given by the expression, $n = (r_n - r_{min})/\Delta T$, and therefore, length $L_r$ wound up to the radius r is given by the following expression (6).

$$L_r = \pi((r - r_{min})/\Delta T)(2r_{min} + (r - r_{min} + \Delta_T)) =$$
$$(\pi/\Delta T)(r - r_{min})(r + r_{min} + \Delta T) \quad (6)$$

In the $(r + r_{min} + \Delta T)$ in the above-described expression (6), the value, $\Delta T$, is very small as compared with $(r + r_{min})$, and therefore, $\Delta T$ can be ignored and the expression (6) can be approximated to the following expression (7). Meanwhile, $(\pi/\Delta T)$ is constant $K_0$.

$$L_r = K_0(r - r_{min})(r + r_{min}) \quad (7)$$

Accordingly, ratio $R_r$ of length $L_r$ wound up to radius, r, with respect to the maximum allowable winding amount (the maximum allowable winding length) $L_1$ is given by the following expression (8).

$$R_r = L_r/L_1 = \frac{(r - r_{min}) \cdot (r + r_{min})}{(r_{max} - r_{min}) \cdot (r_{max} + r_{min})} \quad (8)$$

The length of the outer periphery in the case of the radius, r, is represented as $2\pi r$ and is proportional to the radius, r. The linear velocity on the outer periphery is made constant. For this reason, the time interval in which the core member rotates at a predetermined angle, i.e., the time interval measured by the time interval measuring means is proportional to the radius, r.

Accordingly, the above-described expression (8) can be converted to the expression (1) which indicates winding ratio R of the existing winding amount $L_r$ (at the point in time of measurement) with respect to the maximum allowable winding amount $L_1$ by using time interval t at the time of measurement by the time interval measuring means, time interval $T_0$ in a previously obtained winding initial state, and time interval $T_1$ in a state a little before the previously obtained maximum allowable winding state. In the foregoing, the case was supposed in which the elongated sheet to be wound is wound around the predetermined core member, but even in the case in which the sheet material is wound around the predetermined core member, so long as the sheet material is wound around the outer periphery of the core member substantially uniformly, the following expression (1) can be applied.

$$R = \frac{(t - T_0) \cdot (t + T_0)}{(T_1 - T_0) \cdot (T_1 - T_0)} \quad (1)$$

In accordance with the above-described third and fourth aspects of the present invention, the plurality of sheet materials is sequentially wound around the core member in the form of a roll. In this case, the endless belt is moved in a circulating manner substantially at a constant speed. For this reason, when the sheet material is not wound around the core member, the outer peripheral surface of the core member against which the endless belt abuts is rotated at the same linear velocity as the substantially constant speed. Further, when the sheet material is wound around the core member, the outermost sheet material, against which the endless belt abuts, among the sheet materials wound around the core member is rotated at the same linear velocity as the substantially constant speed. Further, in the first aspect of the present invention, the tension maintaining means is provided. Accordingly, force of the endless belt contacting by pressure the sheet material wound around the core member becomes substantially uniform irrespective of the winding thickness of each of the sheet materials wound around the core member.

Here, in the same way as in deduction of the above-described expression (1), by utilizing that a time that the sheet material is wound around the core member during rotation of the core member at a predetermined angle is proportional to winding diameter, r, which varies as the sheet material is wound around the core member and based on a time that the sheet material is wound during rotation of the core member at the predetermined angle in the winding diameter at the certain point in time (corresponding to time interval t), a time that the sheet material is wound during rotation of the core member at the predetermined angle in the previously obtained winding initial state (corresponding to time interval $T_0$ in the winding initial state), and a time that the sheet material is wound during rotation of the core member at the predetermined angle in the maximum allowable winding state (corresponding to time interval $t_1$ in a state a little before the maximum allowable winding state), the winding ratio of the amount by which the sheet material is wound at the certain point in time with respect to the maximum allowable winding amount is calculated.

In the above-described take-up device, during the rotation of the core member, a signal is generated by the rotational axis detecting means every time the core member rotates at the predetermined angle, and on the basis of the signal, the time interval required for the rotation of the core member at the predetermined angle is measured by the time interval measuring means.

Subsequently, the winding allowable amount calculating means calculates, on the basis of the measured time interval t, the previously obtained time interval $T_0$ in a winding initial state, and time interval $T_1$ in the maximum allowable winding state, winding ratio R of an existing winding amount (at the point in time of measurement) with respect to the previously obtained maximum winding amount by using the above-described expression (1).

As a result, even in a case in which the sheet material is wound around the outer periphery of the core member, the winding ratio R of the existing winding amount with respect to the maximum winding amount of the sheet material can easily be calculated.

Further, in the take-up device according to the fifth aspect of the present invention, winding allowable amount Lb is calculated, on the basis of the calculated winding ratio R and maximum allowable winding amount $L_1$, by the winding allowable amount calculating means. The winding allowable amount Lb is reported by the reporting means.

$$Lb = L_1 \cdot (1-R) \tag{2}$$

As described above, even in the case in which the sheet material is wound around the outer periphery of the core member, the winding allowable amount Lb of the sheet material can easily be predicted and can also be recognized by the operator.

A sixth aspect of the present invention is a take-up device of an image forming sheet material in any one of the fourth aspect and the fifth aspect, wherein the winding ratio calculating means is provided such that an average value of a time interval continuously measured by the time interval measuring means multiple times is used as the time interval t.

In accordance with the sixth aspect of the present invention, in the winding allowable amount calculating means, by using, as time interval t, an average value of the time interval measured continuously by the time interval measuring means multiple times so as to lessen influences of error of measurement in the time interval measuring means, high-accurate winding allowable Lb can be calculated.

A seventh aspect of the present invention is a take-up device of an image forming sheet material in each of the above-described first through sixth aspects, wherein the take-up device is provided in an image forming apparatus in which an image is exposed onto a sheet-shaped photosensitive material and is transferred from the photosensitive material to a sheet-shaped image receiving material to be formed on the image receiving material, and the sheet material is the photosensitive material after the image has been transferred to the image receiving material.

In accordance with the seventh aspect of the present invention, the sheet material is a used waste photosensitive material. In the image forming processing effected in the image forming apparatus, the operator can properly comprehend the winding ratio R and the winding allowable amount Lb of the used photosensitive material.

For example, since the winding allowable amount Lb is recognized prior to start-up of the image forming processing in the image forming apparatus, when the winding allowable amount Lb is small, the used photosensitive material having already been wound can be previously removed from the core member. Accordingly, it is possible to prevent interruption of the image forming processing, which is caused by occurrence of the maximum allowable winding state during execution of the image forming processing of the desired number of sheets of the photosensitive material.

An eighth aspect of the present invention is a take-up device comprising: a core member formed in the shape of a cylinder and supported rotatably, the core member being provided such that a plurality of sheet materials can be sequentially wound around an outer periphery of the core member in the form of a roll; and winding ratio calculating means which utilizes that a time that the sheet material is wound around the core member during rotation of the core member at a predetermined rotational angle is proportional to a winding diameter which varies as the sheet material is wound around the core member, and on the basis of a time that the sheet material is wound around the core member during rotation of the core member at a predetermined rotational angle in the winding diameter at a certain point in time, a time that the sheet material is wound around the core member during rotation of the core member at a predetermined rotational angle in the winding diameter in the winding diameter of a previously obtained winding initial state, and a time that the sheet material is wound around the core member during rotation of the core member at a predetermined rotational angle in the winding diameter a little before a previously obtained maximum allowable winding state, the winding ratio calculating means calculating a winding ratio of an amount by which the sheet material is wound around the core member at the certain point in time with respect to the previously obtained maximum allowable winding amount of the sheet material onto the core member.

A ninth aspect of the present invention is a take-up device comprising: a core member formed in the shape of a cylinder and supported rotatably, the core member being provided such that a plurality of sheet materials can be sequentially wound around an outer periphery of the core member in the form of a roll; rotational angle detecting means which generates a signal every time the core member rotates at a predetermined angle; time interval measuring means for measuring, based on the signal, a time interval required for rotation of the core member at the predetermined angle; and winding ratio calculating means which calculates, on the basis of time interval t measured by the time interval measuring means, time interval $T_0$ required for rotation of the core member at the predetermined angle in a previously obtained winding initial state of the sheet material onto the core member, and time interval $T_1$ required for rotation of the core member at the predetermined angle in a state a little before the previously obtained maximum allowable winding state of the sheet material onto the core member, winding ratio R of an amount by which the sheet material is wound around the core member at the point in time measured by the time interval measuring means with respect to the previously obtained maximum allowable winding amount $L_1$ of the sheet material onto the core member by using the following expression (1):

$$R = \frac{(t - T_0) \cdot (t + T_0)}{(T_1 - T_0) \cdot (T_1 - T_0)} \tag{1}$$

BRIEF DESCRIPTION OF THE DRAWINGS

FIG. 1 is a perspective view showing a structure of a take-up device according to an embodiment of the present invention.

FIG. 2 is a cross-sectional view showing the structure of the take-up device according to the embodiment of the present invention.

FIG. 13 is a diagram for illustrating the ground of an expression (1) for calculation of the winding ratio.

DESCRIPTION OF THE PREFERRED EMBODIMENTS

Referring now to the attached drawings, an embodiment of the present invention will be described hereinafter.

Figure 4:
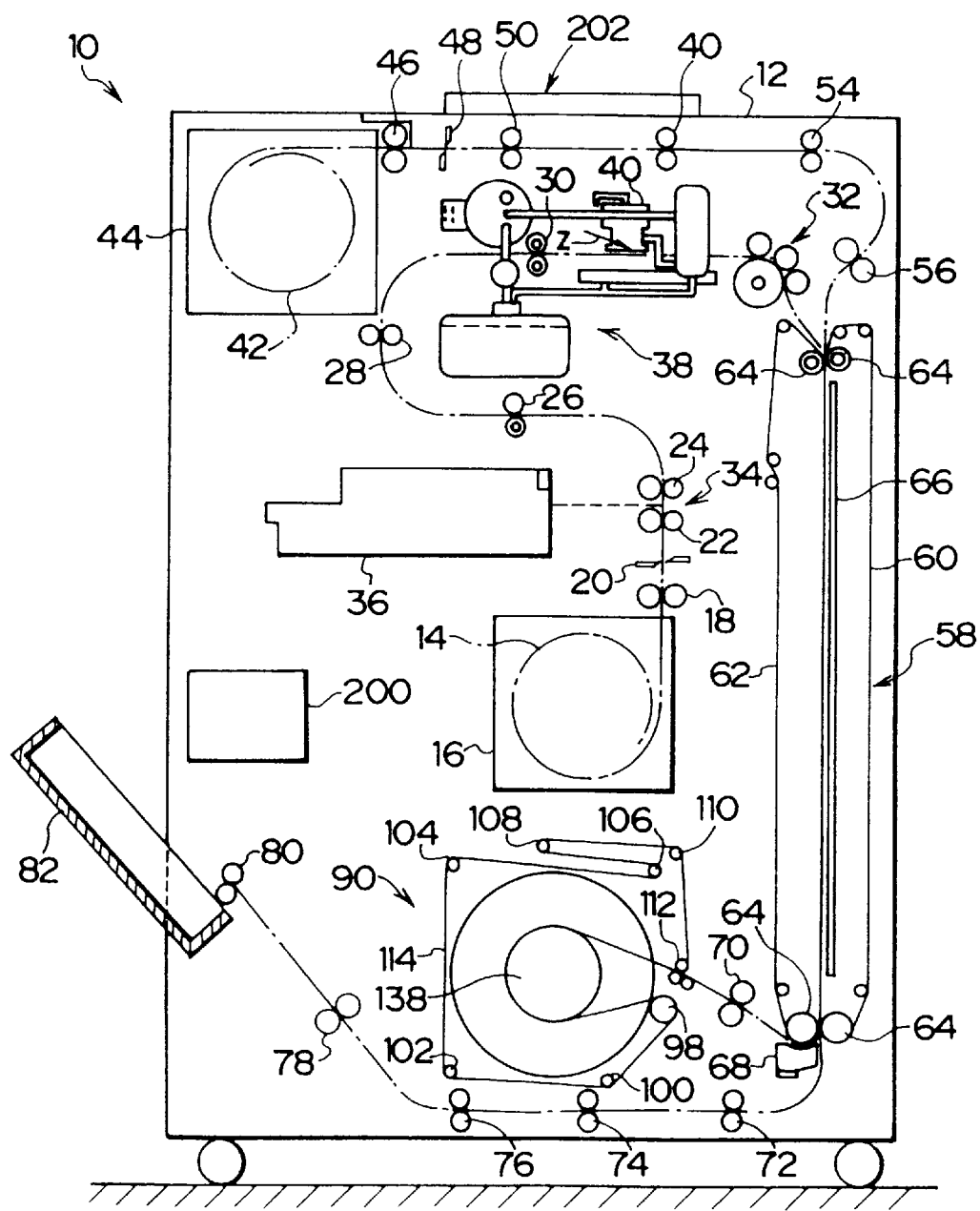
FIG. 4 is an overall structural view of an image recording apparatus to which the take-up device according to the embodiment of the present invention is applied.

FIG. 4 shows an overall structure of an image recording apparatus 10 including a take-up device according to the present invention.

The image recording apparatus 10 is equipped with a machine stand 12. Within the machine stand 12, a photosensitive material magazine 16 is disposed in which a photosensitive material 14 which is a sheet-shaped material of the present invention is accommodated. The photosensitive material 14 is taken up into the photosensitive material magazine 16 in the form of a roll in such a manner that a photosensitive surface (i.e., exposed surface) of the photosensitive material 14 pulled out from the photosensitive material magazine 16 faces an interior of the magazine 16.

Nip rollers 18 and a cutter 20 are disposed in the vicinity of an outlet for pull-out of the photosensitive material in the photosensitive material magazine 16 and the photosensitive material 14 can be cut off after having being pulled out from the photosensitive material magazine 16 by a predetermined length.

A plurality of conveying rollers 22, 24, 26, 28, 30, and 32 are sequentially disposed above the cutter 20 and guide plates (not shown) are each provided between adjacent conveying rollers. An exposure section 34 is provided between the conveying rollers 22 and the conveying rollers 24 and the photosensitive material 14 cut down to the predetermined length is conveyed to the exposure section 34.

A laser-beam irradiation section 36 is provided on the left side of the exposure section 34 of the paper of FIG. 4. A semiconductor laser (not shown) is provided in the laser-beam irradiation section 36 and laser beams of red, green and blue based on an image to be exposed are irradiated from the laser and the photosensitive material 14 positioned in the exposure section 34 is exposed thereby.

A water applying section 38 for applying water used as an image forming solvent is provided above the exposure section 34. The photosensitive material 14 pulled out from the photosensitive material magazine 16 and exposed in the exposure section 34 is nipped and conveyed by the conveying rollers 26, 28, and the like and is then fed into the water applying section 38. The water applying section 38 is provided with an injection tank 40 and water is jetted out from the injection tank 40 at the position indicated by arrow Z so as to be applied to the photosensitive material 14.

Further, an image receiving material magazine 44 in which an image receiving material 42 is accommodated is disposed at an upper left end portion within the machine stand 12 of the paper of FIG. 4. A dye fixing material including mordant is applied to an image forming surface of the image receiving material 42 and the image receiving material 42 is taken up into the image receiving material 42 in the form of a roll in such a manner that the image forming surface of the image receiving material 42 pulled out from the image receiving material magazine 44 faces an interior of the magazine 44.

Nip rollers 46 and a cutter 48 are disposed in the vicinity of an outlet for pull-out of the image receiving material in the image receiving material magazine 44 and the image receiving material 42 can be cut off after having been pulled out from the image receiving material magazine 44 by a predetermined length. In this case, the image receiving material 42 is provided to be cut down to a length shorter than that of the cut-out photosensitive material 14.

Conveying rollers 50, 52, 54, 56 and a guide plate (not shown) are sequentially disposed by the side of the cutter 48 and the image receiving material 42 cut down to the predetermined length can be conveyed to a heat-development transfer section 58 accordingly.

A pair of endless belts 60, 62 is provided in the heat-development transfer section 58 in such a manner that the longitudinal direction thereof coincides with the vertical direction. These endless belts 60, 62 are entrained onto a plurality of entraining rollers 64 and respective outer sides of the loop-shaped endless belts contact by pressure each other. These endless belts 60, 62 are respectively rotated by driving to rotate any one of the entraining rollers 64.

Accordingly, the photosensitive material 14 is conveyed and inserted between the pair of endless belts 60, 62 of the heat-development transfer section 58 by the last conveying rollers 32 on a conveying path. Further, the image receiving material 42 is conveyed synchronously with the conveying of the photosensitive material 14, and in a state in which the photosensitive material 14 precedes the image receiving material 42 by a predetermined length, the image receiving material 42 is conveyed and inserted between the pair of endless belts 60, 62 of the heat-development transfer section 58 by the last conveying rollers 56 on a conveying path. As a result, the image receiving material 42 and the photosensitive material 14 are made overlapping each other.

Further, a heating plate 66 having the shape of a flat board, whose longitudinal direction coincides with the vertical direction, is disposed within the loop of one endless belt 60 in such a manner as to face an inner peripheral surface of the endless belt 60 on the left side of the paper of FIG. 4. A line heater (not shown) is provided in an interior of the heating plate 66 and causes the surface of the heating plate 66 to increase in temperature so that the photosensitive material 14 and the image receiving material 42 can be heated to a predetermined temperature.

As a result, the photosensitive material 14 and the image receiving material 42 made overlapping each other by the pair of endless belts 60, 62 are nipped and conveyed by these endless belts 60, 62 in an overlapping state and are heated by the heating plate 66. The heating processing using the heating plate 66 causes mobile dyes to be emitted from the photosensitive material 14, and at the same time, these dyes are transferred to a dye fixing layer of the image receiving material 42 and an image is thereby formed on the image receiving material 42.

A peeling claw 68 is disposed at the downstream side of the heat-development transfer section 58 (the endless belts 60, 62) in the direction in which the materials are conveyed. The peeling claw 68 is provided to engage with only a leading end portion of the photosensitive material 14 among the photosensitive material 14 and the image receiving material 42 nipped and conveyed between the pair of endless belts 60, 62 so as to separate the photosensitive material 14 from the image receiving material 42.

Photosensitive material discharging rollers 70 are disposed at an upper left side of the peeling claw 68 of the paper of FIG. 4 and the photosensitive material 14 conveyed while being guided by the peeling claw 68 is conveyed to the take-up device 90 by the photosensitive material discharging rollers 70.

Further, a plurality of image receiving material discharging rollers 72, 74, 76, 78 and 80 are sequentially provided at a lower left side of the peeling claw 68 of the paper of FIG. 4 and the image receiving material 42 conveyed from the pair of endless belts 60, 62 is thereby discharged in a tray 82.

Next, the structure of the take-up device 90 will be described with reference to FIGS. 1 through 3. FIG. 1 shows a perspective view of the take-up device 90, and FIGS. 2 and 3 each show a cross-sectional view of the take-up device 90.

The take-up device 90 includes an upper body section 92 and a lower body section 94 which form a container. The upper body section 92 and the lower body section 94 are each formed in the shape of a box and a lower end corner portion of the upper body section 92 is swingably connected to an upper end corner portion of the lower body section 94 by a supporting shaft 96. For this reason, when the upper body section 92 swings around the supporting shaft 96, the container is brought into an open state or a closed state.

Further, a core member 130 and rollers 98, 100, 102 are supported by the lower body section 94 and rollers 104, 106, 108, 110, and 112 are supported by the upper body section 92, which these members will be described later in detail. An endless belt 114 is entrained onto the core member 130 and the rollers 98, 100, 102, 104, 106, 108, 110, 112. In other words, the endless belt 114 is entrained onto the above-described rollers and an outer side thereof is provided to abut by pressure against the core member 130.

A roller 98 is connected to a drive source (not shown) so as to serve as a drive roller. A guide roller 116 is provided immediately above the roller 98. For this reason, when the roller 98 rotates, the endless belt 114 and the guide roller 116 are rotated and the core member 130 is also rotated accordingly.

As a result, the photosensitive material 14 separated from the image receiving material 42 by the peeling claw 68 shown in FIG. 4 and conveyed by the photosensitive material discharging rollers 70 is guided and fed between the endless belt 114 and the core member 130 by the guide roller 116 shown in FIG. 2, and further can be sequentially wound around the core member 130 while being nipped by the endless belt 114 and the core member 130.

Figure 3:
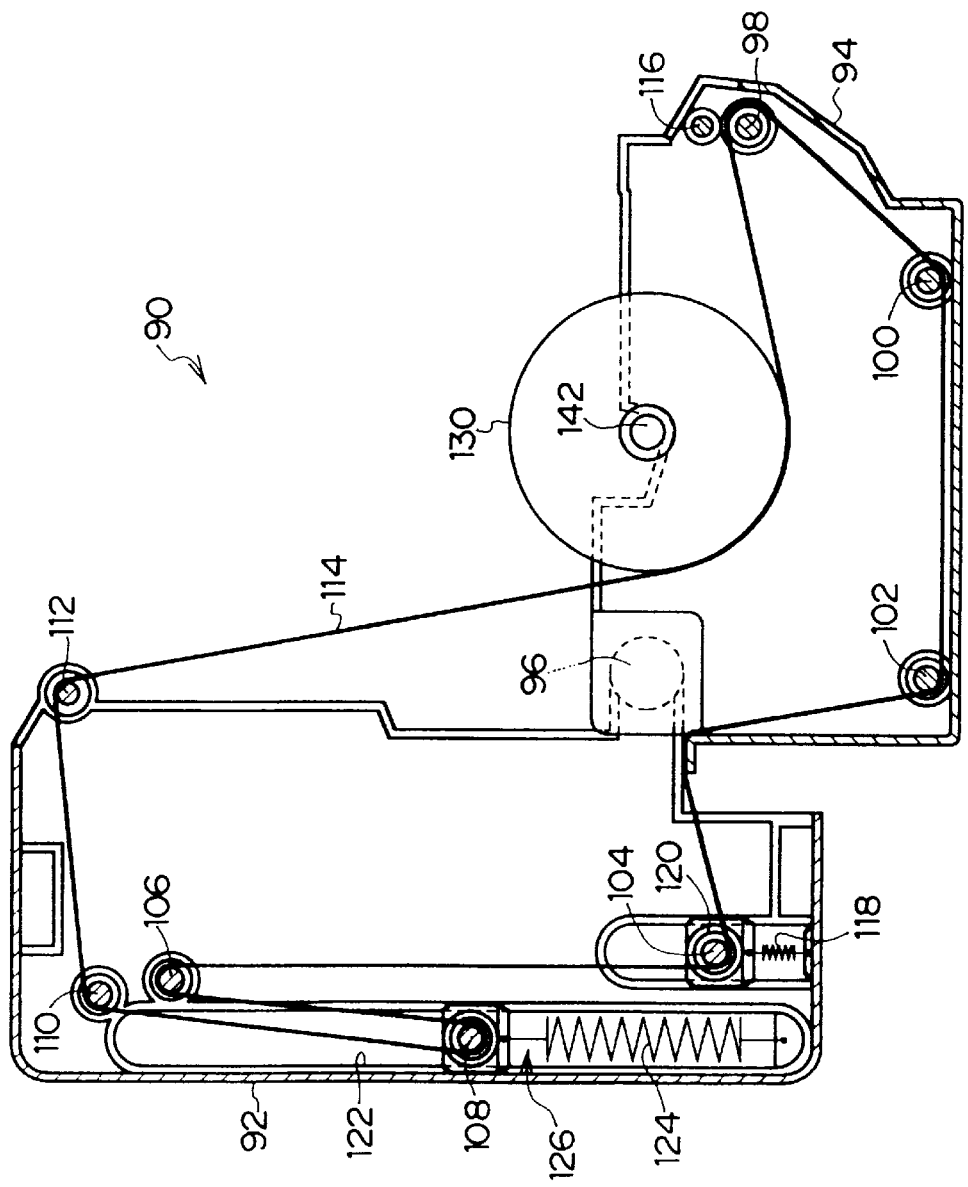
FIG. 3 is a cross-sectional view showing the structure of the take-up device, in an open state, according to the embodiment of the present invention.

Further, a spring 118 is connected to the roller 104 shown in FIGS. 1 through 3 so as to apply a predetermined tension to the endless belt 114. A guide section 120 having the shape of a truncated cone is provided each at axial-direction end portions of the roller 104 so as to prevent a zigzag movement (i.e., deviation) of the endless belt 114.

Moreover, the roller 108 disposed at the uppermost position is provided to be slidably moved along a guide groove 122 provided in the upper body section 92 and is further urged by a spring 124. Namely, the roller 108 and the spring 124 form a tension maintaining portion (buffer portion) 126 for maintaining tension of the endless belt 114 substantially fixedly. The tension maintaining portion 126 is constructed such that, when the winding diameter of the core member 130 gradually increases by the photosensitive material 14 being wound around the core member 130, the roller 108 moves (is displaced) along the guide groove 122 so as to maintain the tension of the endless belt 114 substantially at a fixed value.

Figure 5:
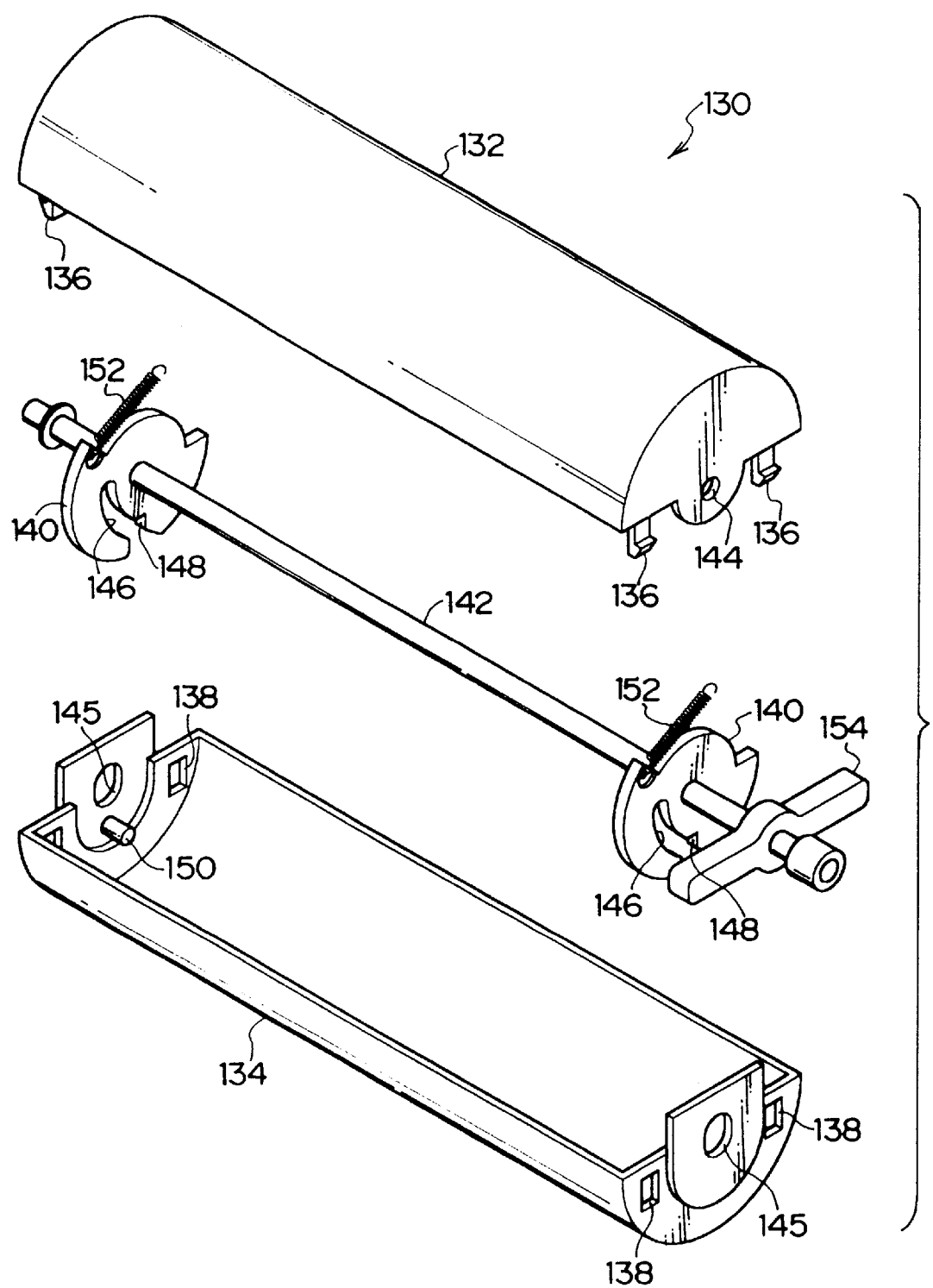
FIG. 5 is a perspective view showing a structure of a core member of the take-up device according to the embodiment of the present invention.

Next, the structure of the core member 130 will be described with reference to FIGS. 5 through 7. FIG. 5 shows a perspective view of the core member 130, and FIGS. 6 and 7 each show a cross-sectional view of the core member 130.

The core member 130 is formed by a first body section 132 and a second body section 134 substantially into the shape of a cylinder as a whole.

Claws 136 are formed at each of axial-direction end portions of the first body section 132 so as to project in the radial direction of the first body section 132, and engaging holes 138 are formed at each of axial-direction end portions of the second body section 134 so as to correspond to the above-described claws 136. When the claws 136 are fitted into the engaging holes 138, the first body section 132 and the second body section 134 are connected integrally with each other so as to form the core member 130 having a substantially cylindrical shape as a whole.

Further, a pair of cams 140 which forms an outside diameter reducing mechanism is accommodated in an interior of the core member 130 (i.e., the first body section 132 and the second body section 134). These cams 140 are each formed substantially in the shape of a disk and are connected by a supporting shaft 142. With the supporting shaft 142 being inserted into a supporting hole 144 of the first body section 132, the cams 140 are rotatably supported in the interior of the core member 130 (the first body section 132 and the second body section 134). Further, in the state in which the cams 140 are supported, the cams 140 are respectively positioned in the vicinities of the axial-direction end portions of the second body section 134.

Further, a cam groove 146 is formed in each of the cams 140 in such a manner as to have an opening at an outer peripheral edge of the cam 140. The cam groove 146 is provided as a cut-in portion which is formed from the outer peripheral edge of the cam 140 gradually toward the center thereof. A holding portion 148 is formed at an open-side end portion of the cam groove 140. Protrusions 150 formed to project from inner surfaces of axial-direction end walls of the second body section 134 are inserted in the cam grooves 146. In this case, with the protrusions 150 being positioned at the holding portions 148 of the cam grooves 146, the protrusions 150 (i.e., the second body section 134) are brought into a state of being separated from the cams 140 (i.e., the first body section 132) and approach movement of the second body section 134 to the first body section 132 is restricted. On the other hand, when the cams 140 rotate with the supporting shaft 142, inner peripheral walls of the cam grooves 146 engage with the protrusions 150 and the protrusions 150 (i.e., the second body section 134) can be drawn (moved close) to the first body section 132.

Further, one end of a spring 152 is connected to each of the cams 140 and another end of each spring 152 is engaged with the first body section 132. The spring 152 urges the cam 140 in the direction in which the protrusion 150 comes out from the cam groove 146. For this reason, the protrusion 150 is usually positioned at the holding portion 148 of the cam groove 146, and therefore, the second body section 134 is brought into a state of being separated from the first body section 132 and the approach movement of the second body section 134 to the first body section 132 is restricted.

One end of the supporting shaft 142 for connecting and supporting the pair of cams 140 is provided to project from the supporting hole 144 of the first body section 132 and a through hole 145 of the second body section 134. A handle 154 is mounted to the end of the supporting shaft 142. As a result, the supporting shaft 142 (i.e., the cams 140) can be rotated by operating the handle 154.

A description will be given hereinafter of each structure of rotation detecting means, detection time interval measuring means, and the like according to the present invention with reference to FIGS. 8A, 8B and 9.

Figure 8A:
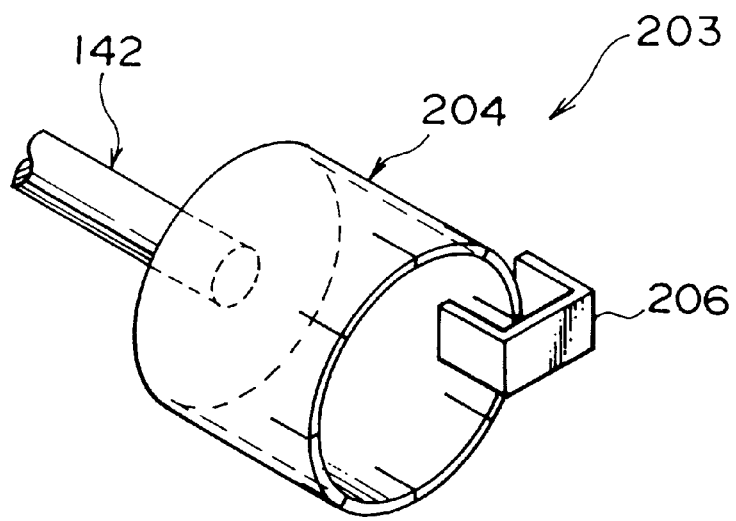
FIG. 8A is a perspective view showing a structure of a time-interval detecting section.

As shown in FIG. 8A, a cylindrical rotating member 204 is fixed at another end of the supporting shaft 142 of the core member 130 and also rotates with the rotation of the core member 130. As shown in FIG. 8B, eight slits S1 through S8 are provided at an end portion, in the direction along the rotational axis, of the rotating member 204 so as to be disposed at equal intervals, i.e., at 45-degree intervals.

Figure 9:
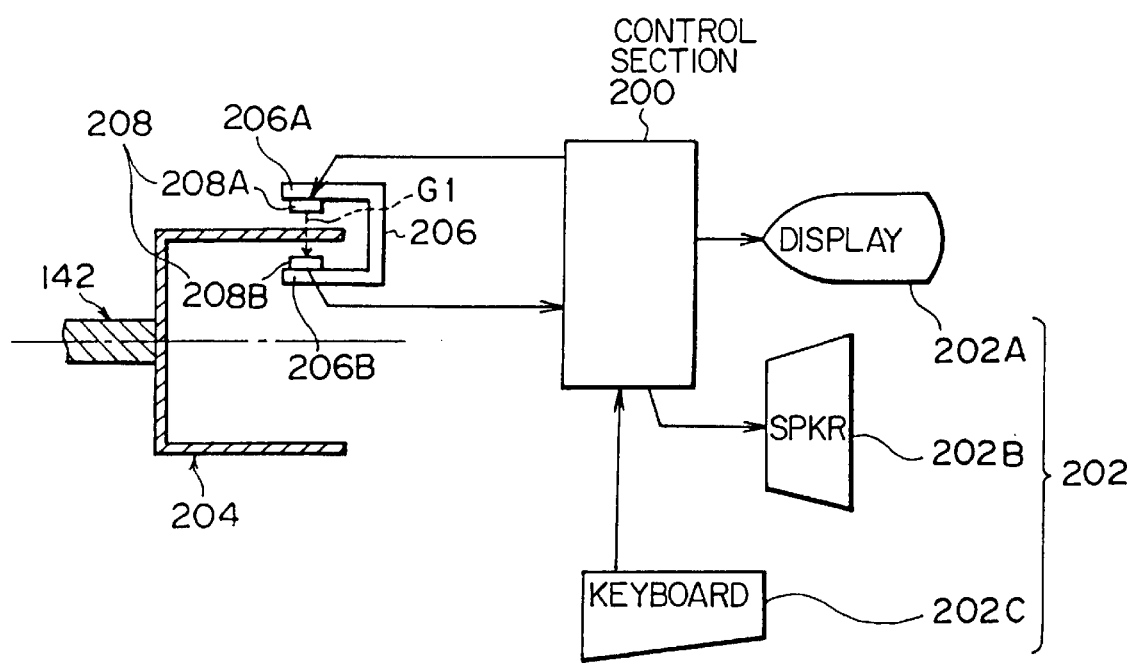
FIG. 9 is a block diagram showing a structure of calculation of a winding ratio and information of a winding state in the embodiment of the present invention.

Further, as shown in FIGS. 8A and 9, a sensor supporting member 206 having a substantially U-shaped cross-sectional configuration is provided so as to straddle a part of the end portion of the rotating member 204. As shown in FIG. 9, in the sensor supporting member 206, a light emitting element 208A is provided at an outer portion 206A positioned at an outer side of the rotating member 204 and a light receiving element 208B is provided at an inner portion 206B positioned at an inner side of the rotating member 204.

Since the above-described structure is provided, light from the light emitting element 208A is shielded by the rotating member 204. Only when the rotating member 204 rotates with the rotation of the core member 130 and the above-described slits are each positioned between the light emitting element 208A and the light receiving element 208B, light from the light emitting element 208A is received by the light receiving element 208B. In other words, every time the core member 130 rotates at an angle of 45 degrees, light from the light emitting element 208A is received by the light receiving element 208B, thereby making it possible to detect that the core member 130 rotates at an angle of 45 degrees. The rotation angle detecting means of the present invention is provided as described above.

The light emitting element 208A and the light receiving element 208B form an optical sensor 208. The state in which light from the light emitting element 208A is received by the light receiving element 208B indicates an on state of the optical sensor 208 and the state in which light from the light emitting element 208A is not received by the light receiving element 208B indicates an off state of the optical sensor 208. Meanwhile, each operation of the light receiving element 208B and the light emitting element 208A is controlled by a control section 200 including a microcomputer (not shown) and a signal transmitted from the light emitting element 208A to the light receiving element 208B, i.e., a detection signal from the optical sensor 208 is transmitted to the control section 200.

The control section 200 has a timer built-in and the timer can measure a time interval (in the above-described embodiment) of signals continuously emitted from the light receiving element 208B. Further, ROM of the built-in microcomputer previously stores information of the following expression (1) for calculating a time interval $T_0$ which is previously obtained in an initial state (i.e., the state in which a sheet material is not wound around the core member 130), a detection time interval $T_1$ in a state a little before the maximum allowable winding state, the maximum allowable winding amount $L_1$ and the above-described winding ratio R. Namely, the control section 200 corresponds to the time interval measuring means and the winding allowable amount calculating means of the present invention.

$$R = \frac{(t - T_0) \cdot (t + T_0)}{(T_1 - T_0) \cdot (T_1 - T_0)} \tag{1}$$

Connected to the control section 200 are a keyboard 202C, a display 202A, and a speaker 202B. The keyboard 202C is used by an operator to input a command or the like for various processing, the display 202A is used to indicate the winding allowable amount Lb of the present invention, a warning message informing an arrival at the maximum allowable winding amount $L_1$, and the like, and the speaker 202B generates a warning tone indicating an arrival at the maximum allowable winding amount $L_1$.

Next, an operation of the present embodiment will be described.

First, image recording processing in the above-described image recording apparatus 10 will be described. In the image recording apparatus 10 shown in FIG. 4, the nip rollers 18 are first activated and the photosensitive material 14 is pulled out by the nip rollers 18. When the photosensitive material 14 is pulled out by the predetermined length, the cutter 20 is activated so that the photosensitive material 14 is cut down to the predetermined length and is conveyed to the exposure section 34 with the photosensitive surface (exposed surface) thereof being directed toward the left side of the paper of FIG. 4. Synchronously with the passing of the photosensitive material 14 through the exposure section 34, the laser-beam irradiation section 36 operates.

In the laser-beam irradiation section 36, a laser beam based on image data is emitted and is made incident on the photosensitive material 14 positioned in the exposure section 34. As a result, an image based on image data is scanned and exposed onto the photosensitive material 14.

The exposed photosensitive material 14 is conveyed to the water applying section 38. In the water applying section 38, water is jetted out from the injection tank 40 toward the photosensitive material 14 in the course of being conveyed and is applied to the photosensitive material 14. Thereafter, the photosensitive material 14 to which water is applied is conveyed between the pair of endless belts 60, 62 of the heat-development transfer section 58 by the conveying rollers 32.

On the other hand, accompanied with the scanning and exposure processing of the photosensitive material 14, the image receiving material 42 is pulled out and conveyed from the image receiving material magazine 44 by the nip rollers 46. When the image receiving material 42 is pulled out by the predetermined length, the cutter 48 is operated so that the image receiving material 42 is cut down to the predetermined length.

After the operation of the cutter 48, the cut-out image receiving material 42 is conveyed by the conveying rollers 50, 52, 54, and 56 while being guided by the guide plate. When the leading end portion of the image receiving material 42 is nipped by the conveying rollers 56, the image receiving material 42 is brought into a waiting state immediately before the heat-development transfer section 58.

The photosensitive material 14 is conveyed by the conveying rollers 32 between the pair of endless belts 60, 62 as described above, and at the same time, the conveying of the image receiving material 42 restarts and the image receiving material 42 is thereby conveyed between the pair of endless belts 60, 62 integrally with the photosensitive material.

Accordingly, the photosensitive material 14 and the image receiving material 42 are made overlapping each other and are nipped and conveyed in an overlapping manner while being heated by the heating plate 66. As a result, an image exposed on the photosensitive material 14 is transferred to the image receiving material 42 and the image is thereby formed on the image receiving material 42.

Further, when the photosensitive material 14 and the image receiving material 42 overlapping each other are discharged from the pair of endless belts 60, 62, the peeling claw 68 engages with the leading end portion of the photosensitive material 14 conveyed in such a manner as to proceed the image receiving material 42 by a predetermined length and the leading end portion of the photosensitive material 14 is separated from the image receiving material 42. Thereafter, the photosensitive material 14 is conveyed by the photosensitive material discharging rollers 70 and is taken up into the take-up device 90.

On the other hand, the image receiving material 42 separated from the photosensitive material 14 is conveyed by the image receiving material discharging rollers 72, 74, 76, 78, and 80 and is then discharged in the tray 82.

In the take-up device 90 in which the photosensitive material 14 is taken up, the photosensitive material 14 separated from the image receiving material 42 by the peeling claw 68 and sent out by the photosensitive material discharging rollers 70 is guided by the guiding roller 116 between the endless belt 114 and the core member 130 (between the first body section 132 and the second body section 134). As a result, the photosensitive material 14 is sequentially wound onto the core member 130 while being nipped between the endless belt 114 and the core member 130.

Figure 6:
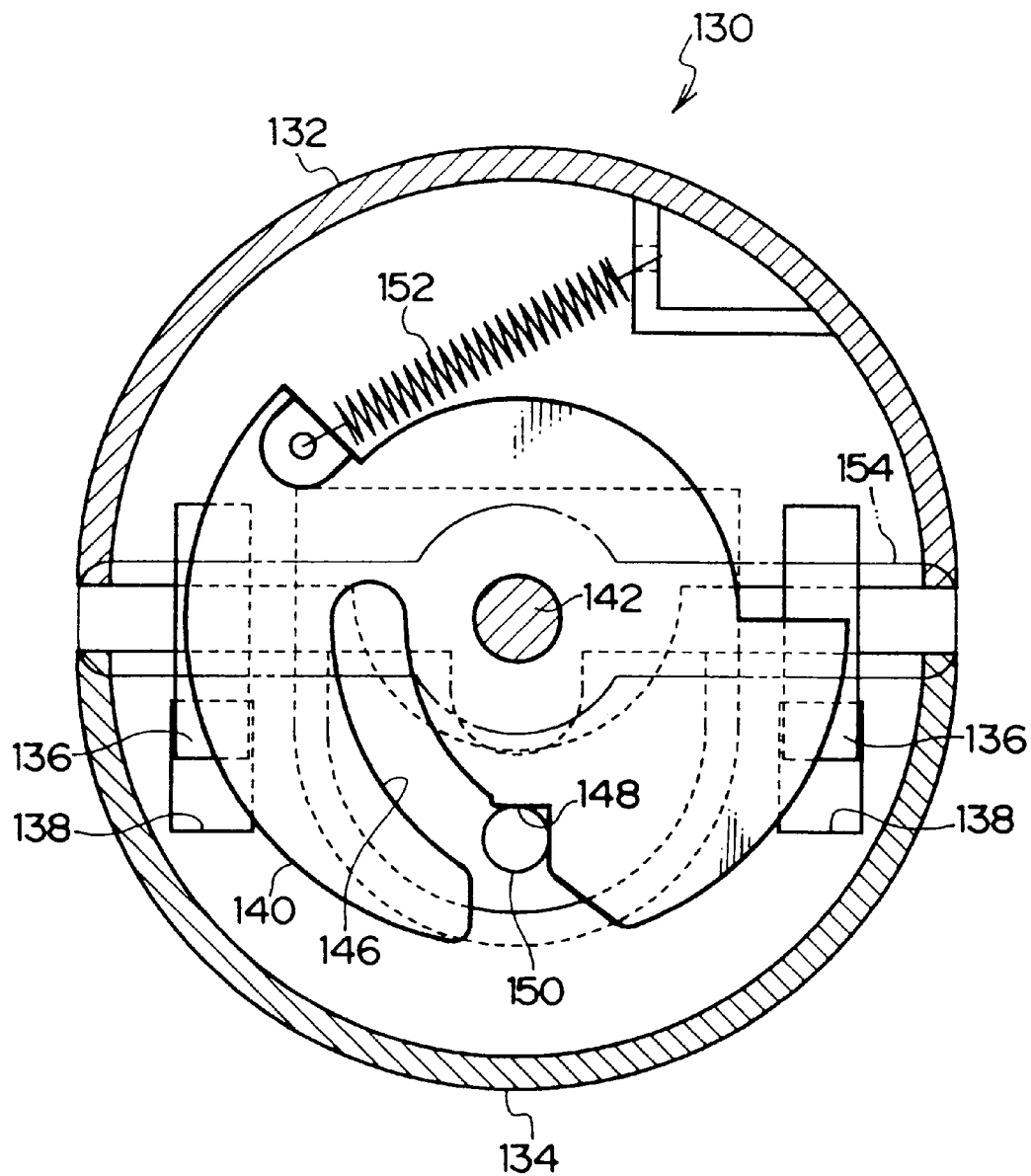
FIG. 6 is a cross-sectional view showing the structure of the core member of the take-up device according to the embodiment of the present invention.
Figure 7:
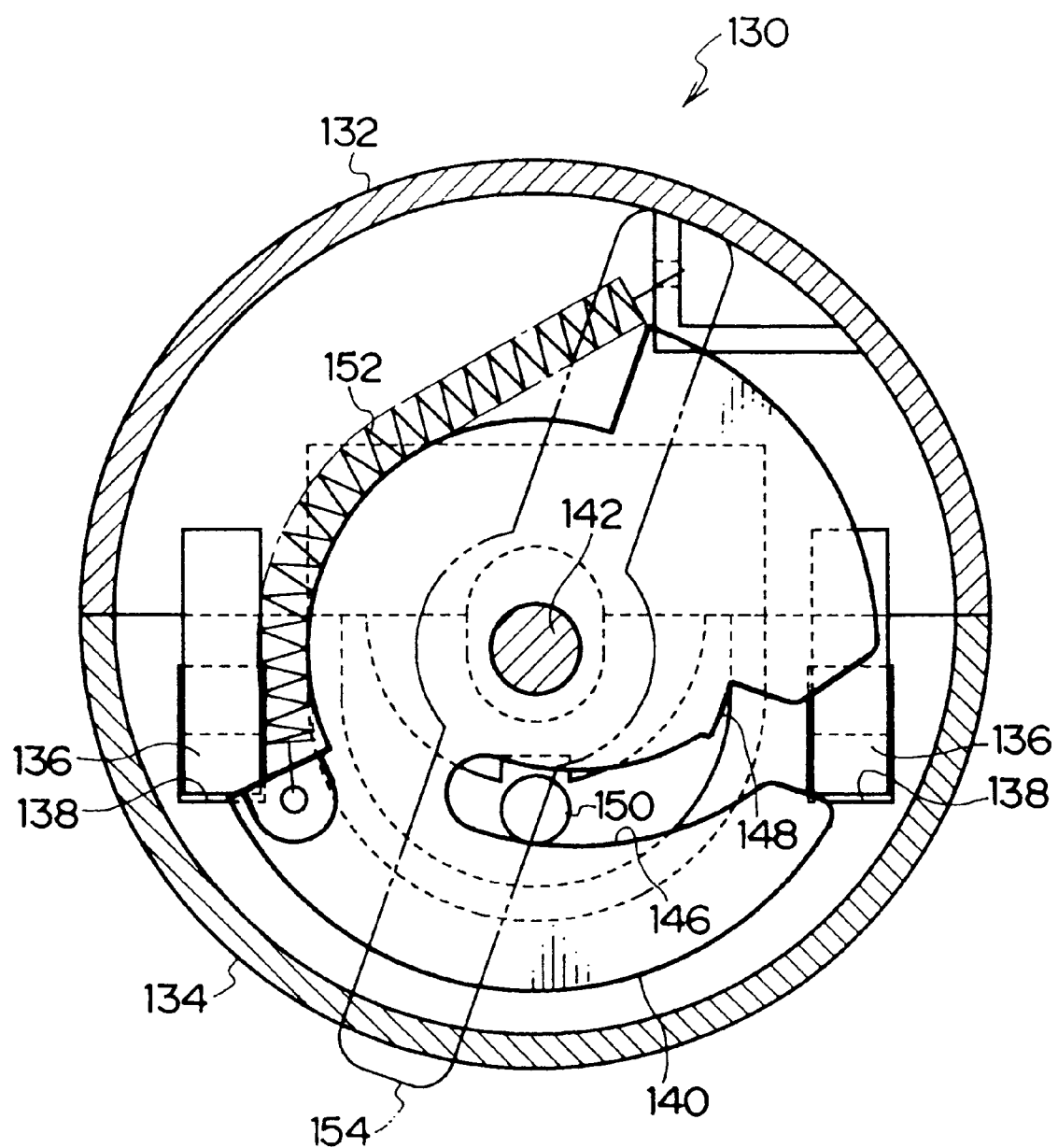
FIG. 7 is a cross-sectional view showing the structure of the core member of the take-up device according to the embodiment of the present invention with a diameter of the core member being reduced.

In this case, as shown in FIG. 6, the protrusions 150 of the second body section 134 are positioned at the holding portions 148 of the cams 140 (the cam grooves 146) and the second body section 134 is brought into a state of being separated from the first body section 132 and is further restricted from moving close to the first body section 132. For this reason, there is no possibility that the diameter of the core member 130 is inadvertently reduced.

Further, when the winding diameter of the core member 130 increases by the photosensitive material 14 being wound around the core member 130, the roller 108 which forms the buffer portion 126 of the endless belt 114 moves (is dislocated) along the guide groove 122 toward the right side of the paper of FIG. 2 and an apparent change of the entraining length of the endless belt 114 which is caused by the increase in the winding diameter of the core member 130 is not thereby absorbed.

Since the photosensitive material 14 is wound around the core member 130 as described above, even if the photosensitive material 14 having a different size is used, the photosensitive materials 14 can be taken up effectively. Further, since the photosensitive material 14 is taken up in such a manner as to be nipped between the core member 130 and the endless belt 114, no curling is formed in the photosensitive material 14. In addition, it is unnecessary to take measures to provide a presser plate for preventing occurrence of the curling in the photosensitive material 14, provide folds (i.e., corrugation) for the photosensitive material 14 to increase the rigidity of the photosensitive material 14, and the like, thereby resulting in simplification in the structure of the apparatus and also in reduction in the cost.

Further, in the take-up device 90, when the upper body section 92 is swung around the supporting shaft 96 with respect to the lower body section 94 so that an interior of the take-up device 90 is brought into an open state, the core member 130 is exposed to an exterior of the take-up device 90. Accordingly, it is possible to easily take out the photosensitive material 14 wound in the takeup device or to perform maintenance.

Moreover, the take-up device 90 is formed as a unit by the upper body section 92 and the lower body section 94, which support the core member 130, a plurality of rollers, and the like. For this reason, the take-up device 90 can be applied to other apparatuses without being limited to the image recording apparatus 10. Further, not only the photosensitive material 14 but also other sheet-shaped material may also be taken up by the take-up device 90, and adaptability of the take-up device 90 is thereby improved to a large extent.

The core member 130 of the take-up device 90 is formed by the first body section 132 and the second body section 134 and the outside diameter thereof can be reduced. For this reason, after the photosensitive material 14 has been completely wound around the core member 130, the core member 130 can be easily separated (pulled out) from the photosensitive material 14.

In other words, when the core member 130 is separated (pulled out) from the photosensitive material 14 after the photosensitive material 14 has been completely taken up around the core member 130 in a layered form, the core member 130 is first removed from the lower body section 94 together with the photosensitive material 14. Subsequently, the supporting shaft 142 (i.e., the cams 140) is rotated by operating the handle 154. When the cams 140 are rotated together with the supporting shaft 142, the internal peripheral walls of the cam grooves 146 engage with the protrusions 150 and the protrusions 150 (i.e., the second body section 134) are pulled toward the first body section 132, and therefore, as shown in FIG. 7, the outside diameter of the core member 130 is reduced. As a result, the core member 130 can easily be separated (pulled out) from the photosensitive material 14 closely taken up in the layered form.

As described above, the core member 130 not only allows the sheet-shaped material such as the photosensitive material 14 to be wound therearound, but also can be separated from the photosensitive material 14 having been wound around the core member 130 without requiring any time and labor.

Further, the core member 130 is formed from the first body section 132 and the second body section 134, and therefore, the structure thereof is extremely simple. Moreover, the core member 130 is constructed such that the first body section 132 and the second body section 134 can be provided to move close to each other by operating the handle 154 to rotate the cams 140, and therefore, the outside diameter of the core member 130 can be enlarged or reduced by an extremely simple operation and any time and labor is not required.

A description will be given of calculation processing of the winding allowable amount Lb according to the present invention with reference to FIG. 10.

Figure 10:
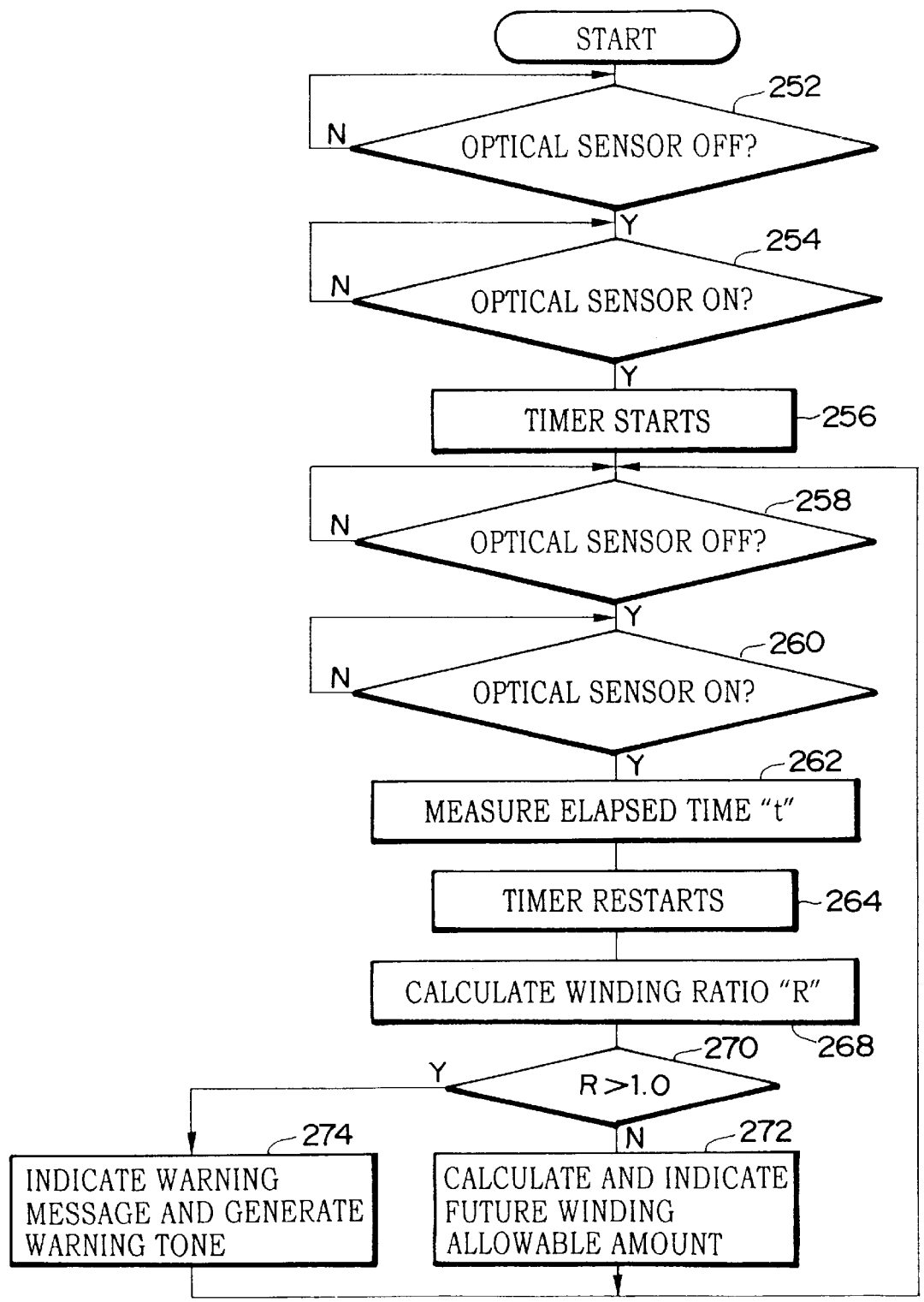
FIG. 10 is a flowchart showing a control routine in the embodiment of the present invention.

At the time when the image recording processing starts in the image recording apparatus 10, or at the time when a start command of predetermined calculation processing of a winding allowable amount is inputted from the keyboard 202C by an operator, the control routine shown in FIG. 10 starts and is then executed in the control section 200.

In steps 252 and 254 in FIG. 10, the time when the optical sensor 208 is changed from an off state to an on state is detected as a reference time for detecting that the core member 130 has rotated at a predetermined angle (in this case, 45 degrees). Namely, when the optical sensor 208 is brought into an off state in step 252, the process proceeds to step 254 and when the optical sensor 208 is changed to an on state, the process proceeds to step 256.

When the optical sensor 208 is changed from the off state to the on state, i.e., when one of the slits is positioned between the light emitting element 208A and the light receiving element 208B, in step 256, the timer starts.

In the next steps 258 and 260, in order to detect a next reference time when the core member 130 further rotates at an angle of 45 degrees so that a subsequent slit is moved at a position between the light emitting element 208A and the light receiving element 208B, the time when the optical sensor 208 is changed from the off state to the on state is detected. When the subsequent slit is moved at the position between the light emitting element 208A and the light receiving element 208B by the rotation of the core member 130 at the angle of 45 degrees, and the optical sensor 208 is changed from the off state to the on state so that the decision of step 260 is yes, the process proceeds to step 262, in which elapsed time t from the previous reference time in which the decision of step 254 is yes to an update reference time is measured by the timer.

After the timer restarts in step 264, in the subsequent step 268, information of the following expression (1) for calculating the detection time interval $T_0$ in the winding initial state, the detection time interval $T_1$ in the maximum allowable winding state, and the winding ratio R described later are read from ROM, and by applying the above-measured elapsed time t to the expression (1), the winding ratio R is calculated.

$$R = \frac{(t - T_0) \cdot (t + T_0)}{(T_1 - T_0) \cdot (T_1 - T_0)} \quad (1)$$

The subsequent step 270 determines whether the calculated winding ratio R is greater than "1.0". When the winding ratio R is less than "1.0", a determination that the photosensitive material has not been brought into the maximum winding state can be made, and therefore, the process proceeds to step 272, in which ratio Rx of a winding amount which is allowable in the future is obtained by calculation of (1−winding ratio R) and winding allowable amount Lb is obtained by calculation of (maximum winding amount $L_1$×ratio Rx of the winding allowable amount). Further, the calculated winding allowable amount Lb is displayed on the display 202A. As a result, the operator can recognize the winding allowable amount Lb. Meanwhile, in the case that the winding allowable amount Lb is displayed, for example, only if display of 50 sheets or thereabouts is made in terms of the photosensitive materials 14 having size of A4 (210 mm×297 mm), it is possible for the operator to make a plan for forthcoming image recording processing, thereby resulting in improvement in effectiveness.

Subsequently, the process returns to step 258, the next reference time is detected in steps 258 and 260, and on the basis of the next reference time, the processes of steps 262 through 272 are executed. As described above, the winding allowable amount Lb is calculated and displayed every time the core member 130 rotates at the angle of 45 degrees while the photosensitive material 14 is wound around the core member 130.

When the take-up device 90 is brought into the maximum winding state and the winding ratio R is greater than "1.0", the decision of step 270 is yes and the process proceeds to step 274, in which a warning message informing that the take-up device 90 has been brought into the maximum winding state is displayed on the display 202A and a warning tone is generated from the speaker 202B. As a result, the operator can immediately recognize the maximum winding state in the take-up device 90 and can promptly effect proper processing for temporarily stopping the image recording processing to remove the photosensitive material 14 from the core member 130, and the like.

Subsequent processes of the control routine shown in FIG. 10 is completed at the time when the image recording processing ends in the image recording apparatus 10 or at the time when a stop command of predetermined calculation processing of a winding allowable amount is inputted from the keyboard 202C by the operator.

As described above, in accordance with the present embodiment, even when the take-up device is used in which the sheet-shaped photosensitive material 14 is wound around the outer periphery of the core member 130, the winding allowable amount Lb can easily be predicted and reported to the operator. Further, when the take-up device 90 is brought into the maximum winding state, a warning message can be urgently given to the operator.

Further, the operator can recognize the winding allowable amount Lb by, prior to start-up of the image recording processing, inputting the start command of the calculation processing of the winding allowable amount from the keyboard 202C and executing the calculation processing to allow calculation and indication of the winding allowable amount Lb at that time. When the winding allowable amount Lb is small, the used photosensitive material which has already been wound can be removed in advance, thereby making it possible to prevent interruption of the image forming processing, which is caused by the maximum winding state in the take-up device, during execution of the image forming processing of the desired number of sheets of the photosensitive material.

Meanwhile, in the above-described embodiment, calculation and indication of the winding allowable amount Lb is effected every time the core member 130 rotates at the angle of 45 degrees. However, an average value of multiple measurement results of elapsed time t required for calculation of the winding allowable amount Lb, i.e., high-accurate elapsed time t is used to predict the winding allowable amount Lb.

Figure 15:
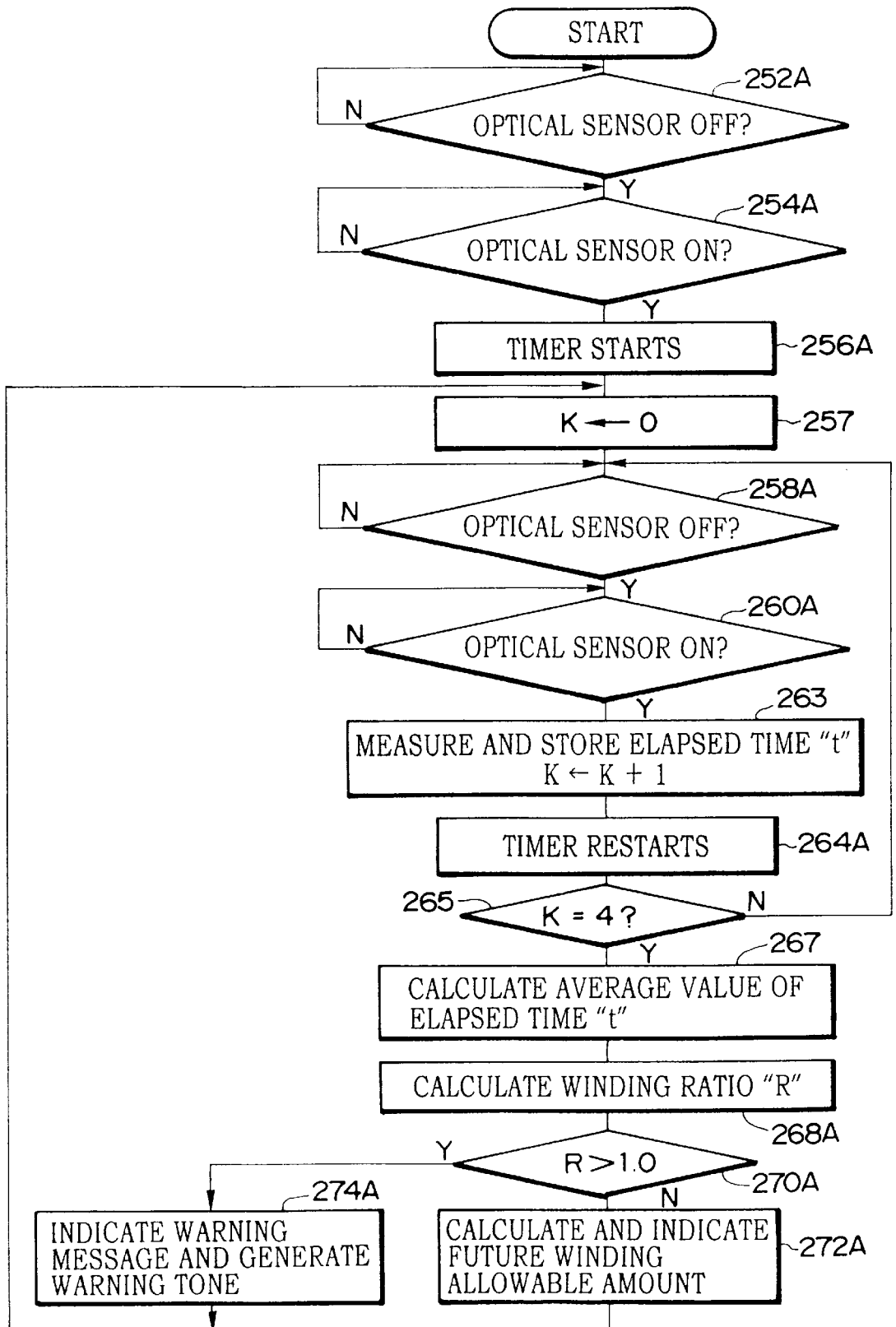
FIG. 15 is a flowchart showing a control routine in which an allowable winding amount is calculated by using an average value of a plurality of measurement results as elapsed time t.

As an example, a control routine when an average value of four measurement results of elapsed time t is used is shown in FIG. 15. Note that the same processes as those of the control routine shown in FIG. 10 each have "A" at the end of the number of the step.

In step 257 shown in FIG. 15, a counter K for counting up the number of measurement of elapsed time t is initialized at "0", and thereafter, elapsed time t is measured at a reference time detected by steps 258A and 260A and is stored in RAM which is built in the control section 200 (step 263). Further, step 263 effects count-up processing in the counter K and step 264A restarts the timer.

Subsequently, the above-described steps 258 through 264 are repeated three more times and elapsed time t is measured four times. After measurement of four times, the counter K is set at "4", and therefore, the decision of step 265 is yes and the process proceeds to step 267. In step 267, the measurement results of four times of elapsed time t is averaged, and in the next step 268A, the winding ratio R is calculated by using the average value of elapsed time t. Subsequently, on the basis of the winding ratio R, calculation and indication of the winding allowable amount Lb is effected. As a result, the winding allowable amount Lb can be predicted accurately.

Figure 8B:
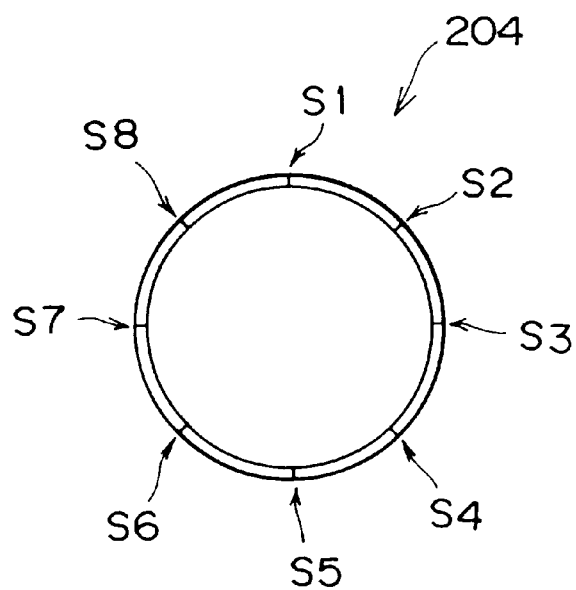
FIG. 8B is a diagram in which a rotating member provided in the time-interval detecting section is projected in a direction along a rotational axis of the rotating member.
Figure 11:
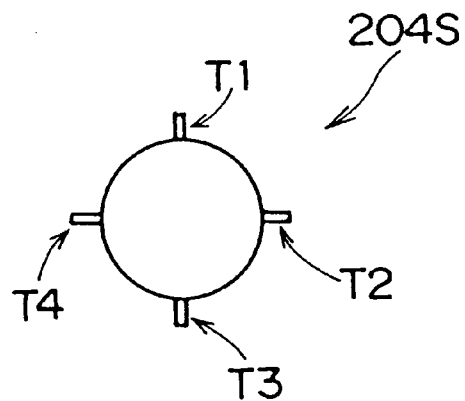
FIG. 11 is a diagram in which a rotating member in another structural example of the time-interval detecting section is projected in a direction along a rotational axis of the rotating member.
Figure 12:
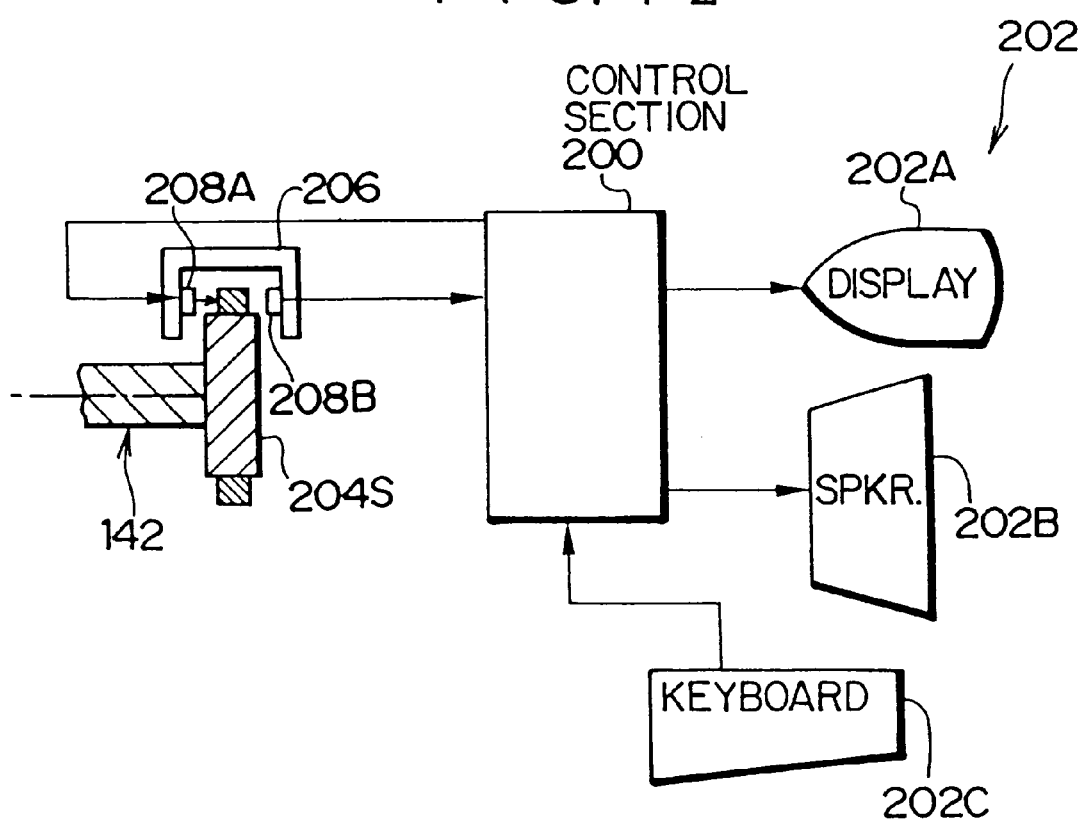
FIG. 12 is a block diagram showing another structural example of calculation of a winding ratio and information of a winding state.
Figure 14:
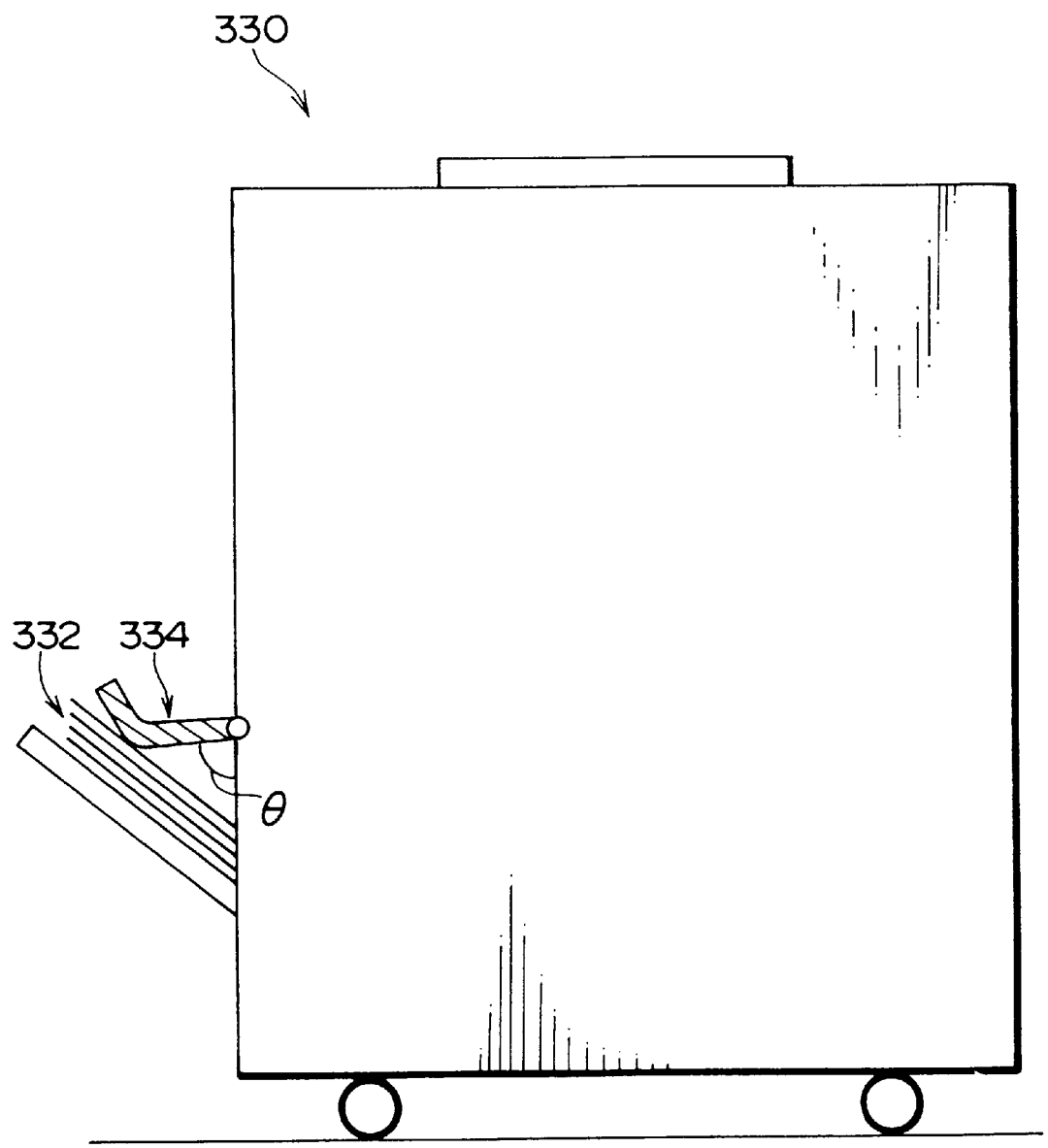
FIG. 14 is a diagram showing an example of a structure of prediction of an allowable accumulation amount in a conventional accumulating apparatus.

Further, the rotation detecting means of the present invention is not limited to the structure shown in FIGS. 8A, 8B and 9 and other structures may also be applied. For example, as shown in FIGS. 11 and 12, a rotating member 204S can be used having the shape of a circular plate and including a plurality of (as an example, four) thin plate-shaped blades T1 through T4 disposed in an outer peripheral portion of the circular plate at equal intervals. Moreover, as shown in FIG. 12, the sensor supporting member 206 having a substantially U-shaped cross-sectional configuration is disposed in such a manner as to straddle the rotating member 204S in a direction parallel to a rotational axis of the rotating member 204S, and therefore, the optical sensor 208 is brought into the on state or the off state due to the blades of the rotating member 204S rotating with the core member 130. In this structural example, every time the core member 130 rotates at the angle of 90 degrees, the optical sensor 208 is changed from the on state to the off state. Namely, by detecting the time when the optical sensor 208 is changed from the on state to the off state, it is possible to detect that the core member 130 has rotated at the angle of 90 degrees.

On the other hand, in the above-described embodiment, the take-up device of the present invention is applied to an image recording apparatus in which an image is exposed onto a sheet-shaped photosensitive material and the exposed image is transferred from the photosensitive material to the sheet-shaped image receiving material and is thereby formed on the image receiving material, and the take-up device is applied to the used photosensitive material after formation of an image. However, the take-up device is not limited to application to the image forming apparatus. For example, the take-up device of the present invention may be applied to an image forming apparatus in which an image is exposed onto a heat-development photosensitive material, the exposed heat-development photosensitive material and a processing member for forming the image on the heat-development photosensitive material by being heated in such a manner as to overlap the heat-development photosensitive material are made overlapping each other, the overlapping heat-development photosensitive material and the processing member are heated to form the image on the heat-development photosensitive material, and the take-up device may be applied to the used processing member and may also be used to predict the winding allowable amount.

Further, on the basis of the winding allowable amount Lb calculated in the above-described embodiment, a remaining amount of the photosensitive material 14 accommodated in the photosensitive material magazine 16 can be predicted so that a new photosensitive material 14 can be supplied for the photosensitive material magazine 16 at a suitable time. For example, in a case that the maximum winding amount $L_1$ in the core member 130 and the maximum accommodation amount in the photosensitive material magazine 16 are substantially the same, when the winding allowable amount Lb approaches "0", a determination can be made that the remaining amount of the photosensitive material 14 accommodated in the photosensitive material magazine 16 approaches "0", and therefore, the new photosensitive material 14 can be supplied for the photosensitive material magazine 16 at the suitable time.

Moreover, the calculation principle of the winding ratio R in the take-up device 90 of the present invention can also be applied to calculation of the ratio of the remaining amount in a feed reel of each of the photosensitive material magazine 16 and the image receiving material magazine 44. In other words, so long as a speed of supply (a linear velocity) and take-up thickness in an outer peripheral portion in the feed reel of each of the photosensitive material magazine 16 and the image receiving material magazine 44 is maintained fixedly, a deduction principle of the above-described expression (1) can be applied as it is, and by measuring the time interval in which the feed reel rotates at a predetermined angle (for example, 45 degrees or 90 degrees), the above-described expression (1) can be used to calculate the ratio of the remaining amount of materials in the feed reel of each magazine.

What is claimed is:

1. A take-up device in which sheet materials are sequentially wound, comprising:

a mounting structure:

a core member having a cylindrical shape and mounted for rotation on said mounting structure;

a plurality of rollers mounted for rotation on said mounting structure;

an endless belt entrained across said plurality of rollers for circulating travel, said endless belt contacting an outer periphery of said core member to rotate said core member, said endless belt and said core member forming a nip to receive said sheet materials, such that said sheet materials are wound around said core member; and tension maintaining means having a tension-buffer mechanism for adjustingly maintaining a tension of said endless belt such that reliable winding of the sheet material on said core can be achieved due to said endless belt;

wherein said tension-buffer mechanism includes a belt-taking-up roller and a spring connected to said roller said belt-taking-up roller and said spring being accommodated in a guide groove, said belt-taking-up roller being biased by said spring such that said roller can apply tension to said endless belt and can be slidably moved along said guide groove in accordance with a change in a winding diameter of the sheet material wound around said core member.

2. A take-up device of an image forming sheet material according to claim 1, wherein said mounting structure is a container comprising:

a first box-shaped member; and a second box-shaped member connected to said first box-shaped member in a relatively swingable manner;

wherein said container accommodates said core member, said plurality of rollers, said tension maintaining means, and said endless belt; and wherein, when said container is brought into an open state, said core member is removable from said container.

3. A take-up device of an image forming sheet material according to claim 1, wherein said tension maintaining means includes at least one roller of said plurality of rollers being translatable.

4. A take-up device of an image forming sheet material according to claim 1, wherein said endless belt contacts said core member along a substantially C-shaped line around a periphery of said core member.

5. A take-up device of an image forming sheet material according to claim 1, wherein said core member includes diameter reducing means for reducing the diameter of said core member.

6. A take-up device of an image forming sheet material according to claim 5, wherein said diameter reducing means has an operating handle which is used to reduce the diameter of said core member.

7. A take-up device of an image forming sheet material according to claim 1, in which said endless belt is moved in a circulating manner substantially at a constant speed, said take-up device further comprising:

winding ratio calculating means which utilizes that a time that the sheet material is wound around said core member during rotation of said core member through a predetermined rotational angle is proportional to a winding diameter which varies as the sheet material is wound around said core member;

wherein, on the basis of (1) a time that the sheet material is wound around said core member during rotation of said core member through the predetermined rotational angle at a certain point in time, (2) a time that the sheet material is wound around said core member during rotation of said core member through the predetermined rotational angle of a previously obtained winding initial state, and (3) a time that the sheet material is wound around said core member during rotation of said core member through the predetermined rotational angle before a previously obtained maximum allowable winding state, said winding ratio calculating means calculates a winding ratio of an amount of sheet material wound around said core member at the certain point in time to a previously obtained maximum allowable winding amount of sheet material which can be wound around said core member.

8. A take-up device of image forming sheet materials according to claim 7, wherein said take-up device is provided in an image forming apparatus in which an image is (1) formed on a sheet of photosensitive material, and (2) transferred from the sheet of photosensitive material to a sheet of image receiving material, and the sheet material is the sheet of photosensitive material after the image has been transferred therefrom.

9. A take-up device of an image forming sheet material according to claim 1, in which said endless belt is moved in a circulating manner substantially at a constant speed, said take-up device further comprising:

rotational angle detecting means which generates a signal every time said core member rotates through a predetermined angle;

time interval measuring means for measuring, based on the signal, a time interval t required for rotation of said core member through the predetermined angle; and winding ratio calculating means which calculates, on the basis of (1) the time interval t measured by said time interval measuring means, (2) a time interval $T_0$ required for rotation of said core member through the predetermined angle of a previously obtained winding initial state, and (3) a time interval $T_1$ required for rotation of said core member through the predetermined angle of a previously obtained maximum allowable winding state, a winding ratio R of an amount of sheet material wound around said core member at the point in time measured by said time interval measuring means to a previously obtained maximum allowable winding amount $L_1$ of sheet material which can be wound around the core member by using the following expression (1):

$$R = \frac{(t - T_0) \cdot (t + T_0)}{(T_1 - T_0) \cdot (T_1 - T_0)}. \tag{1}$$

10. A take-up device of an image forming sheet material according to claim 8, further comprising:

winding allowable amount calculating means which calculates, on the basis of the winding ratio R calculated by said winding ratio calculating means and the maximum allowable winding amount $L_1$, the winding allowable amount Lb of the sheet material which can be wound around said core member after the certain point in time by using the following expression (2); and reporting means for reporting the winding allowable amount Lb calculated by said winding allowable amount calculating means:

$$Lb = L_1 \cdot (1-R). \tag{2}$$

11. A take-up device of image forming sheet materials according to claim 10, wherein said winding ratio calculating means is provided such that an average value of a time interval continuously measured by said time interval measuring means multiple times is used as the time interval t.

12. A take-up device of an image forming sheet material according to claim 9, wherein said winding ratio calculating means is provided such that an average value of a time interval continuously measured by said time interval measuring means multiple times is used as the time interval t.

13. A take-up device of image forming sheet materials according to claim 9, wherein said take-up device is provided in an image forming apparatus in which an image is (1) formed on a sheet of photosensitive material and (2) transferred from the sheet of photosensitive material to a sheet of image receiving material, and the sheet material is the sheet of photosensitive material after the image has been transferred therefrom.

14. A take-up device of an image forming sheet material according to claim 1, wherein said take-up device is provided in an image forming apparatus in which an image is (1) formed on a sheet of photosensitive material, and (2) transferred from the sheet of photosensitive material to a sheet of image receiving material, and the sheet material is the sheet of photosensitive material after the image has been transferred therefrom.

15. A take-up device comprising:

a mounting structure;

a core member formed in the shape of a cylinder and rotatably mounted on said mounting structure, said core member being provided such that a plurality of sheet materials can be sequentially wound around an outer periphery of said core member in the form of a roll; and winding ratio calculating means which utilizes that a time that the sheet material is wound around said core member during rotation of said core member through a predetermined rotational angle is proportional to a winding diameter which varies as the sheet material is wound around said core member;

wherein, on the basis of (1) a time that the sheet material is wound around said core member during rotation of said core member through the predetermined rotational angle at a certain point in time, (2) a time that the sheet material is wound around said core member during rotation of said core member through the predetermined rotational angle of a previously obtained winding initial state, and (3) a time that the sheet material is wound around said core member during rotation of said core member through the predetermined rotational angle before a previously obtained maximum allowable winding state, said winding ratio calculating means calculates a winding ratio of an amount of sheet material wound around said core member at the certain point in time to a previously obtained maximum allowable winding amount of sheet material which can be wound around said core member.

16. A take-up device according to claim 15, wherein said take-up device is provided in an image forming apparatus in which an image is (1) formed on a sheet of photosensitive material, and (2) transferred from the sheet of photosensitive material to a sheet of image receiving material, and the sheet material is the sheet of photosensitive material after the image has been transferred therefrom.

17. A take-up device comprising:

a mounting structure;

a core member formed in the shape of a cylinder and rotatably mounted on said mounting structure, said core member being provided such that a plurality of sheet materials can be sequentially wound around an outer periphery of said core member in the form of a roll;

rotational angle detecting means which generates a signal every time said core member rotates through a predetermined angle;

time interval measuring means for measuring, based on the signal, a time interval t required for rotation of said core member through the predetermined angle; and winding ratio calculating means which calculates, on the basis of (1) the time interval t measured by said time interval measuring means, (2) a time interval $T_0$ required for rotation of said core member through the predetermined angle of a previously obtained winding initial state, and (3) a time interval $T_1$ required for rotation of said core member through the predetermined angle of a previously obtained maximum allowable winding state, a winding ratio R of an amount of sheet material wound around said core member at the point in time measured by said time interval measuring means to a previously obtained maximum allowable winding amount $L_1$ of sheet material which can be wound around the core member by using the following expression (1):

$$R = \frac{(t - T_0) \cdot (t + T_0)}{(T_1 - T_0) \cdot (T_1 - T_0)}. \tag{1}$$

18. A take-up device according to claim 17, further comprising:

winding allowable amount calculating means which calculates, on the basis of the winding ratio R calculated by said winding ratio calculating means and the maximum allowable winding amount $L_1$, the winding allowable amount Lb of the sheet material which can be wound around said core member after the certain point in time by using the following expression (2); and reporting means for reporting the winding allowable amount Lb calculated by said winding allowable amount calculating means:

$$Lb = L_1 \cdot (1 - R). \tag{2}$$

19. A take-up device according to claim 17, wherein said winding ratio calculating means is provided such that an average value of a time interval continuously measured by said time interval measuring means multiple times is used as the time interval t.

20. A take-up device according to claim 17, wherein said take-up device is provided in an image forming apparatus in which an image is (1) formed on a sheet of photosensitive material, and (2) transferred from the sheet of photosensitive material to a sheet of image receiving material, and the sheet material is the sheet of photosensitive material after the image has been transferred therefrom.

* * * * *